(12) United States Patent
Decker

(10) Patent No.: US 11,520,625 B2
(45) Date of Patent: *Dec. 6, 2022

(54) SEISMIC PROCESSING TASK PREDICTIVE SCHEDULER

(71) Applicant: Schlumberger Technology Corporation, Sugar Land, TX (US)

(72) Inventor: Marvin Decker, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,890

(22) Filed: Feb. 15, 2021

(65) Prior Publication Data

US 2021/0165687 A1   Jun. 3, 2021

Related U.S. Application Data

(63) Continuation of application No. 16/097,315, filed as application No. PCT/US2017/031492 on May 8, 2017, now Pat. No. 10,956,209.

(60) Provisional application No. 62/332,661, filed on May 6, 2016.

(51) Int. Cl.
  *G06F 9/48*   (2006.01)
  *G06F 9/50*   (2006.01)
  *G01V 1/24*   (2006.01)

(52) U.S. Cl.
  CPC .......... *G06F 9/4881* (2013.01); *G06F 9/5066* (2013.01); *G01V 1/247* (2013.01)

(58) Field of Classification Search
  CPC ...... G06F 9/4881; G06F 9/5066; G01V 1/247
  See application file for complete search history.

(56) References Cited

U.S. PATENT DOCUMENTS

| | | | | |
|---|---|---|---|---|
| 5,418,953 A | * | 5/1995 | Hunt ..................... | G06F 9/5066 718/102 |
| 8,004,516 B2 | * | 8/2011 | Matsumoto ........... | G06F 9/4856 709/200 |

(Continued)

OTHER PUBLICATIONS

Zhang, Qian, Hong Liang, and Yongshan Xing. "A parallel task scheduling algorithm based on fuzzy clustering in cloud computing environment." Int. J. Mach. Learn. Comput 4.5 (2014): 437-444. (Year: 2014).*

(Continued)

*Primary Examiner* — Matthew J Brophy

(57) ABSTRACT

A method for scheduling tasks includes receiving input that was acquired using one or more data collection devices, and scheduling one or more input tasks on one or more computing resources of a network, predicting one or more first tasks based in part on the input, assigning one or more placeholder tasks for the one or more predicted first tasks to the one or more computing resources based in part on a topology of the network, receiving one or more updates including an attribute of the one or more first tasks to be executed as input tasks are executed, modifying the one or more placeholder tasks based on the attribute of the one or more first tasks to be executed, and scheduling the one or more first tasks on the one or more computing resources by matching the one or more first tasks to the one or more placeholder tasks.

20 Claims, 20 Drawing Sheets

(56) References Cited

U.S. PATENT DOCUMENTS

| | | | | |
|---|---|---|---|---|
| 8,254,207 | B2* | 8/2012 | Nemeth | G01V 1/223 367/76 |
| 8,837,255 | B2* | 9/2014 | Ross | G01V 1/006 367/24 |
| 8,856,462 | B2* | 10/2014 | Lu | G01V 1/345 711/153 |
| 8,942,060 | B2* | 1/2015 | Abma | G01V 1/364 367/20 |
| 9,063,248 | B2* | 6/2015 | Liu | G01V 1/303 |
| 9,915,746 | B2* | 3/2018 | Eick | G01V 1/3808 |
| 2004/0098447 | A1* | 5/2004 | Verbeke | G06F 9/5055 709/201 |
| 2007/0124363 | A1* | 5/2007 | Lurie | H04L 41/00 709/202 |
| 2008/0021951 | A1* | 1/2008 | Lurie | G06F 9/5072 709/202 |
| 2009/0328046 | A1* | 12/2009 | Proctor | G06F 9/4881 718/100 |
| 2010/0115526 | A1* | 5/2010 | Mincarelli | G06F 9/5038 718/104 |
| 2013/0325419 | A1* | 12/2013 | Al-Shaikh | G06F 9/5066 703/2 |
| 2013/0326535 | A1* | 12/2013 | Matsuda | G06F 9/505 718/104 |
| 2013/0346359 | A1* | 12/2013 | Lu | G06F 16/284 707/600 |
| 2014/0140174 | A1* | 5/2014 | Lu | G06F 9/5066 367/73 |
| 2014/0229953 | A1* | 8/2014 | Sevastiyanov | G06F 9/4881 718/102 |
| 2014/0257780 | A1* | 9/2014 | Jing | G06F 30/20 703/6 |
| 2015/0006085 | A1* | 1/2015 | Bisley | G01V 1/36 702/14 |
| 2015/0039236 | A1* | 2/2015 | Laws | G01V 1/003 702/14 |
| 2015/0078126 | A1* | 3/2015 | Lu | G06F 12/08 367/11 |
| 2015/0116208 | A1* | 4/2015 | Akitomi | G06F 3/0237 345/156 |
| 2015/0347186 | A1* | 12/2015 | Truong | G06F 9/4887 718/103 |
| 2015/0362619 | A1* | 12/2015 | AlShaikh | G06F 9/5072 703/10 |
| 2016/0018546 | A1* | 1/2016 | Eick | G01V 1/3852 367/24 |
| 2016/0178801 | A1* | 6/2016 | Bobrek | G01V 99/005 703/2 |
| 2016/0266266 | A1* | 9/2016 | Hu | G01V 1/282 |
| 2018/0217873 | A1* | 8/2018 | Hobro | G06F 9/5027 |
| 2019/0138352 | A1 | 5/2019 | Decker | |

OTHER PUBLICATIONS

International Search Report and Written Opinion issued in the related PCT/US2017/031492, dated Jul. 17, 2017 (15 pages).

International Preliminary Report on Patentability issued in the related PCT/US2017/031492, dated Nov. 15, 2018 (11 pages).

Abma, Ray. Shot Scheduling in simultaneous shooting, 2014 SEG Annual meeting. Society of exploration geophysicists, 2014 (Year: 2014).

Buyya, Rajkumar, and Manzur Murshed. Gridsim: A toolkit for the modeling and simulation of distributed resource management and scheduling for grid computing, Concurrency and Comutation: practice and experience 14.13-15 (2002): 1175-1220 (Year: 2002).

Deelman, Ewa, et al. Pegasus: mapping large-scale workflows to distributed resources. Workflows for e-science. Springer, London, 2007, 376-394 (Year: 2007).

Tang, Hsiang-Kuo, Parmesh Ramanathan, and Katherine Morrow. Inserting placeholder slack to improve run-time scheduling of non-preemptible real-time tasks in heterogeneous systems. 2014 27th conference on VLSI design and 2014 13th international conference on embedded systems. IEEE, 2014 (Year: 2014).

Zhang, Qian, Hong Liang, and Yongshen Xing, A parallel task scheduling algorithm based on fuzzy clustering in cloud computing environment, International Journal of Machine Learning and Computing 4.5 (2014): 437 (Year: 2014).

Zhao, Changhai, et al. DECF: A course-grained data-parallel programming framework for seismic processing. 2008 International conference on computer science and software engineering. vol. 3, IEEE, 2008 (Year: 2008).

* cited by examiner

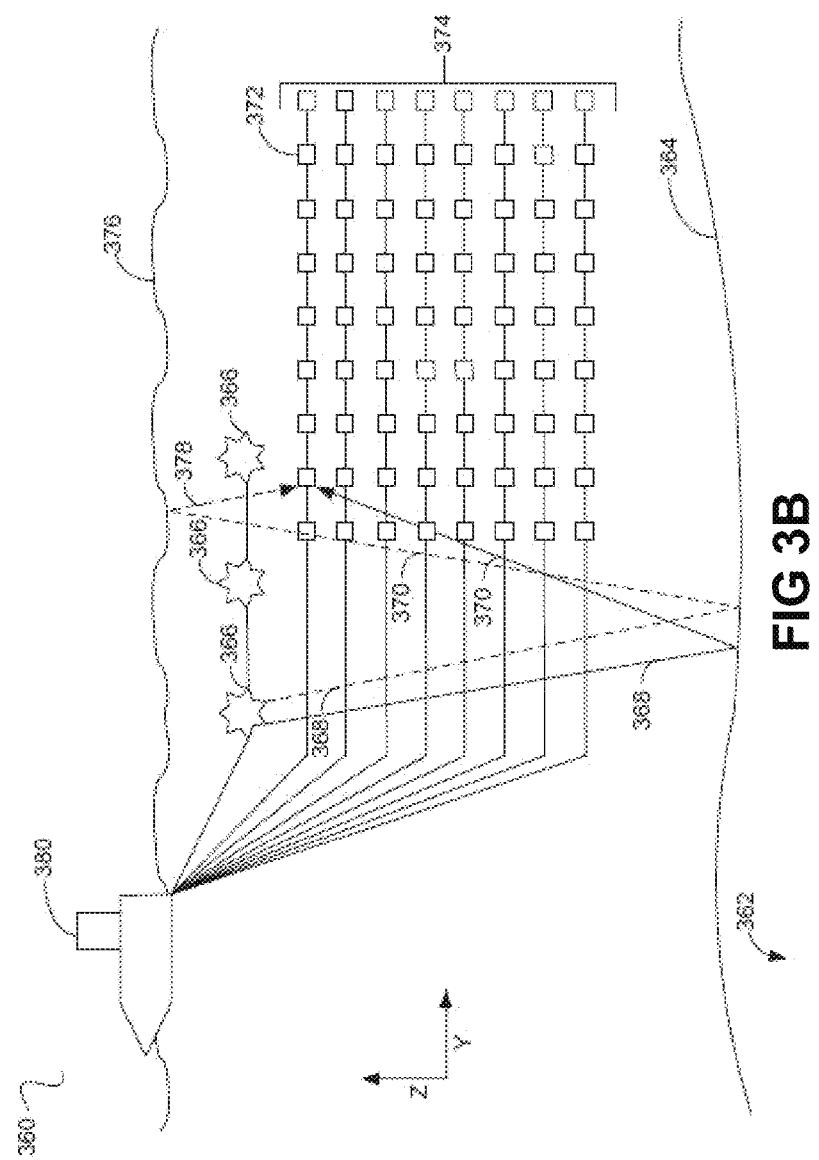

SEISMIC PROCESSING TASK PREDICTIVE SCHEDULER

CROSS-REFERENCE TO RELATED APPLICATIONS

This application is a Continuation of U.S. application Ser. No. 16/097,315, which is a National Stage Entry of International Application PCT/US2017/031492 filed May 8, 2017, which claims priority to U.S. Provisional Patent Application Ser. No. 62/332,661, filed on May 6, 2016, which are incorporated herein by reference in their entirety.

BACKGROUND

Task management in distributed computing is the process by which scheduling and recording of processing tasks is done. A processing task is a quantity of work or responsibility that may be assigned to one or more computing devices. In turn, the devices execute code and/or otherwise apply an algorithm to perform a given processing task. For example, in a seismic context, noise may be attenuated in shot gathers by applying noise mitigation algorithms. Processing tasks in this type of application may thus include applying the noise attenuation algorithms to the data, sorting the data into shot gathers, applying algorithms to individual shot gathers, starting processes on compute nodes that apply algorithms to process shot gathers, writing shot gathers with noise attention applied to disk, etc. A distributed scheduling engine may orchestrate scheduling one or more of these tasks during the execution of the parallel job.

For complex processing sequences, there may be processing tasks derived from other processing tasks. For example, the first processing task may be to read the data into memory, the second processing task may be to sort the data, and the next sequence of processing tasks may be to apply noise attenuation algorithms to each shot gather in the sorted data. The tasks to apply the noise attenuation algorithms are derived from the task to sort the data. In this example, a single processing task is used to derive several processing tasks.

For more complex processing scenarios, some processing tasks may be derived from one or more input tasks. For example, if a processing sequence were extended to include resorting shot gathers to common image point gathers, applying algorithms to correct for the effects of signal propagation as a function of offset, and summing traces in a common image point gather to produce output traces, many shot tasks may correspond to a single common image processing task.

SUMMARY

Embodiments of the disclosure may provide a method for scheduling tasks. The method includes receiving input that was acquired using one or more data collection devices, and scheduling one or more input tasks on one or more computing resources of a network. The one or more input tasks include processing the input. The method also includes predicting one or more first tasks based at least in part on the input, assigning one or more placeholder tasks for the one or more predicted first tasks to the one or more computing resources based at least in part on a topology of the network, receiving one or more updates including an attribute of the one or more first tasks to be executed as input tasks are executed, modifying the one or more placeholder tasks based on the attribute of the one or more first tasks to be executed, and scheduling the one or more first tasks on the one or more computing resources by matching the one or more first tasks to the one or more placeholder tasks.

In an embodiment, the attribute includes a number of the one or more first tasks to be executed, and modifying the one or more placeholder tasks includes splitting the one or more placeholder tasks such that a number of one or more placeholder tasks matches the number of the one or more first tasks to be executed.

In an embodiment, the method also includes predicting one or more second tasks based on the input, the one or more first tasks, or both, scheduling the one or more second tasks based on the topology of the network, at least partially executing the one or more first tasks, merging results of executing of the one or more first tasks into the one or more second tasks, and executing the one or more second tasks.

In an embodiment, the one or more input tasks have a first attribute based on the input, executing the one or more input tasks provides data representing a second attribute of the input, the one or more placeholder tasks have a first attribute that is the same as the first attribute of the one or more input tasks, and a second attribute that is initialized to an out-of-set value. Further, scheduling the one or more first tasks comprises setting the second attribute of the one or more placeholder tasks to equal the second attribute.

In an embodiment, receiving input from the data collection device includes receiving seismic data, the first attribute includes a shot line number, and the second attribute includes a shot number.

In an embodiment, the input includes seismic data, and the method further includes executing the one or more input tasks including converting data from the representation of an acquisition system to a representation for a subsequence processing activity, executing the one or more first tasks including applying time-domain processing comprising one or more of filtering, amplitude normalization, or coherent noise attenuation, and executing the one or more second tasks includes one or more of: processing in a non-time domain, or generating an image to check the quality of the data.

In an embodiment, respective input tasks of the one or more input tasks correspond to seismic data collected over individual durations of a series of durations, respective first tasks of the one or more first tasks include one or more processing operations for a predetermined set of data recorded during the individual duration of the individual input task, and the second task corresponds to at least one of the individual durations.

In an embodiment, scheduling the one or more input tasks includes scheduling a first input task on a first group of computing resources, and scheduling a second input task on a second group of computing resources. The computing resources of the first group communicate with one another more quickly than with the computing resources of the second group. In an embodiment, assigning the one or more placeholder tasks includes scheduling a first placeholder task on the first group, and scheduling a second placeholder task on the second group. The first placeholder task is predicted based on the first input task, and the second placeholder task is predicted based on the second input task.

Embodiments of the disclosure may also provide a computing system including one or more processors and a memory system including one or more computer-readable media storing instructions that, when executed by at least one of the one or more processors, cause the computing system to perform operations. The operations include receiving input that was acquired using one or more data collection devices, and scheduling one or more input tasks on one or more computing resources of a network. The one or more input tasks include processing the input. The operations also includes predicting one or more first tasks based at least in part on the input, assigning one or more placeholder tasks for the one or more predicted first tasks to the one or more computing resources based at least in part on a topology of the network, receiving one or more updates including an attribute of the one or more first tasks to be executed as input tasks are executed, modifying the one or more placeholder tasks based on the attribute of the one or more first tasks to be executed, and scheduling the one or more first tasks on the one or more computing resources by matching the one or more first tasks to the one or more placeholder tasks.

Embodiments of the disclosure may further provide a computer-readable media storing instructions that, when executed by at least one processor of a computing system, cause the computing system to perform operations. The operations include receiving input that was acquired using one or more data collection devices, and scheduling one or more input tasks on one or more computing resources of a network. The one or more input tasks include processing the input. The operations also includes predicting one or more first tasks based at least in part on the input, assigning one or more placeholder tasks for the one or more predicted first tasks to the one or more computing resources based at least in part on a topology of the network, receiving one or more updates including an attribute of the one or more first tasks to be executed as input tasks are executed, modifying the one or more placeholder tasks based on the attribute of the one or more first tasks to be executed, and scheduling the one or more first tasks on the one or more computing resources by matching the one or more first tasks to the one or more placeholder tasks.

Embodiments of the disclosure may also include a computing system configured to one receive input that was acquired using one or more data collection devices, and scheduling one or more input tasks on one or more computing resources of a network. The one or more input tasks include processing the input. The computing system is further configured to predict one or more first tasks based at least in part on the input, assigning one or more placeholder tasks for the one or more predicted first tasks to the one or more computing resources based at least in part on a topology of the network, receive one or more updates including an attribute of the one or more first tasks to be executed as input tasks are executed, modify the one or more placeholder tasks based on the attribute of the one or more first tasks to be executed, and schedule the one or more first tasks on the one or more computing resources by matching the one or more first tasks to the one or more placeholder tasks.

Embodiments of the disclosure may further provide a computing system including means for receiving input that was acquired using one or more data collection devices, and means for scheduling one or more input tasks on one or more computing resources of a network. The one or more input tasks include processing the input. The system also includes means for predicting one or more first tasks based at least in part on the input, means for assigning one or more placeholder tasks for the one or more predicted first tasks to the one or more computing resources based at least in part on a topology of the network, means for receiving one or more updates including an attribute of the one or more first tasks to be executed as input tasks are executed, means for modifying the one or more placeholder tasks based on the attribute of the one or more first tasks to be executed, and means for scheduling the one or more first tasks on the one or more computing resources by matching the one or more first tasks to the one or more placeholder tasks.

It will be appreciated that the foregoing is not to be considered exhaustive or exclusive, but merely introduces a subset of the features more fully described in the description below.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention.

The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
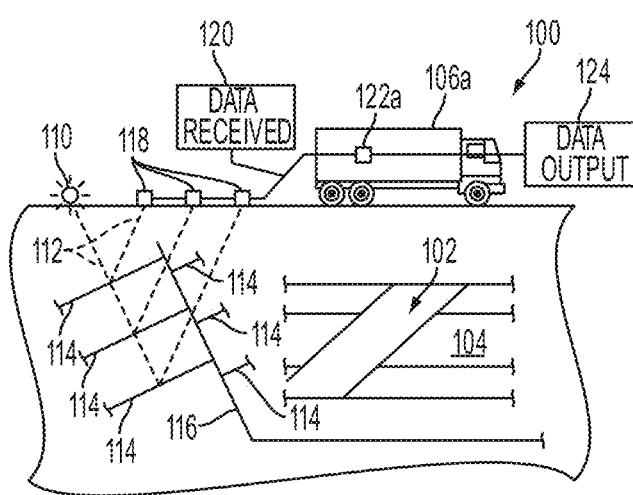

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 1B:
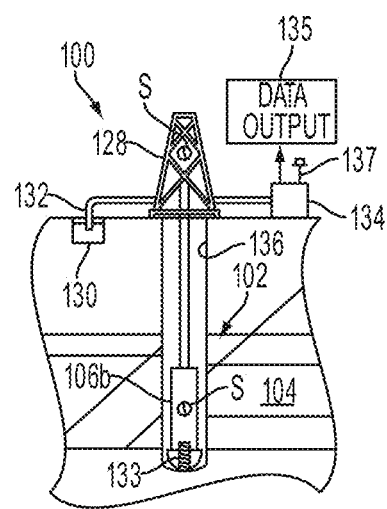

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to improve portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
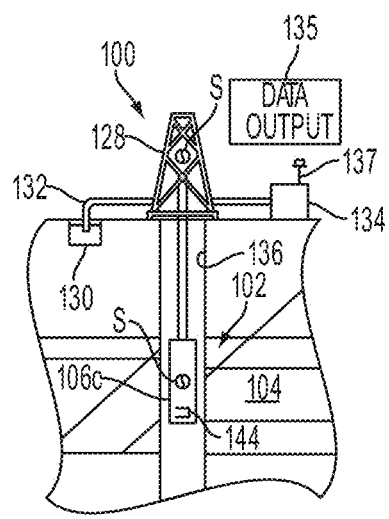

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 1D:
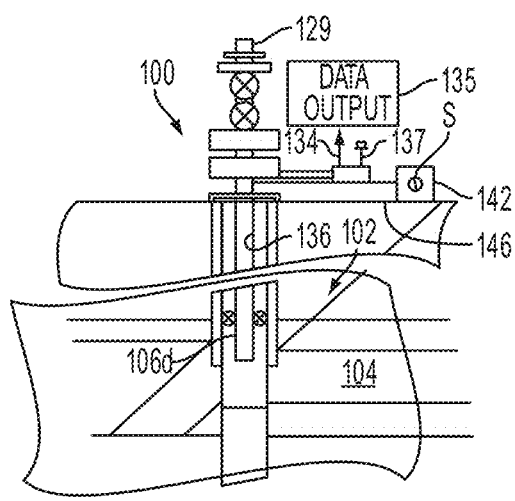

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
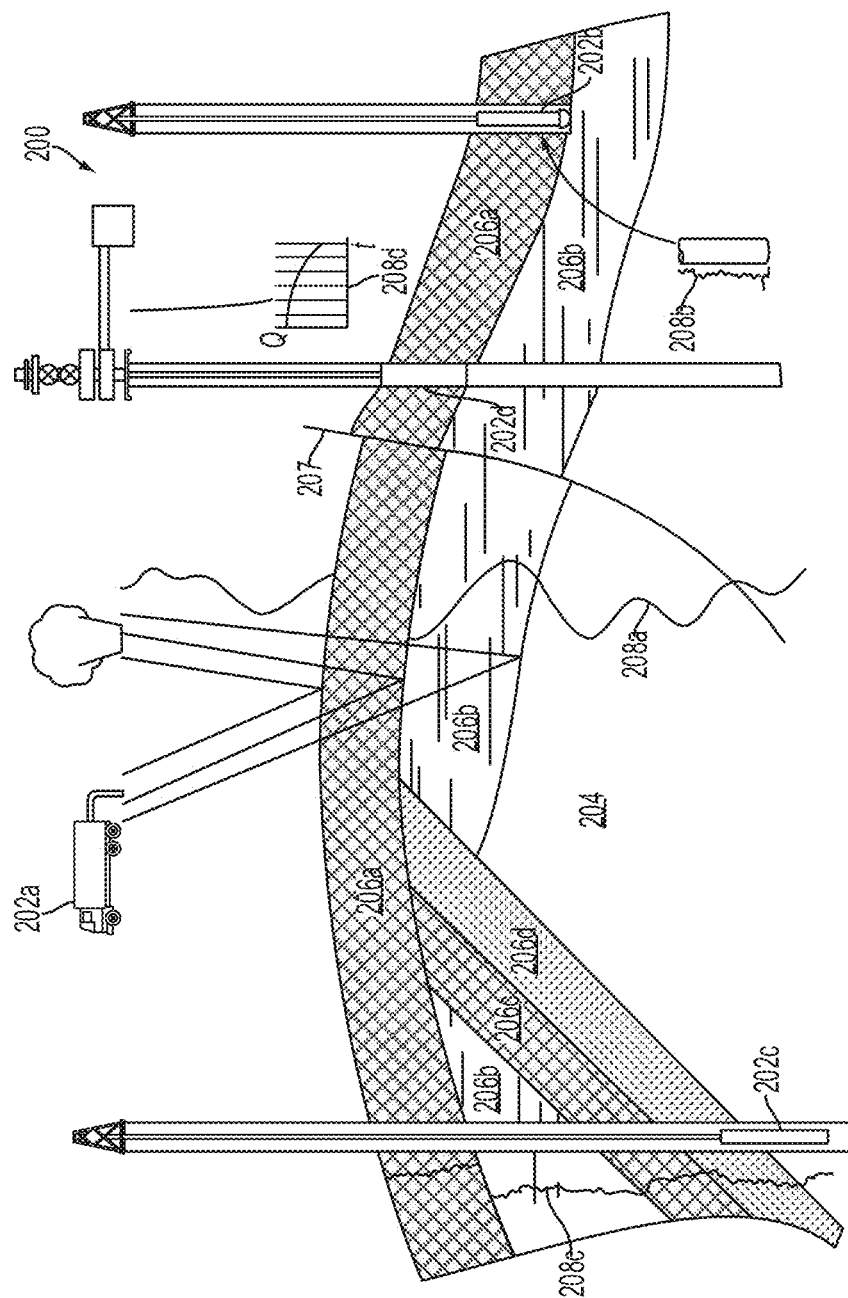

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
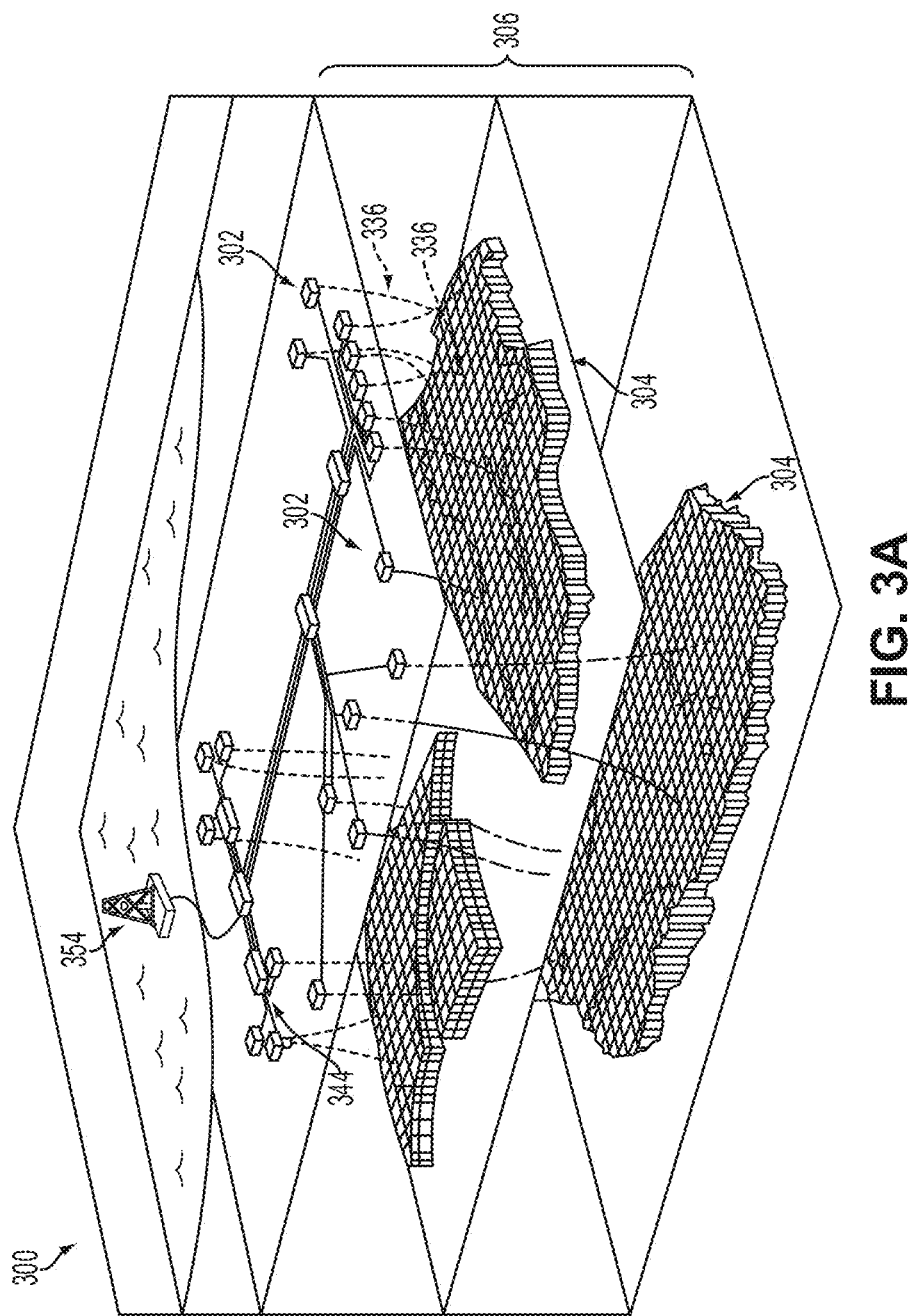

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow the streamers in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
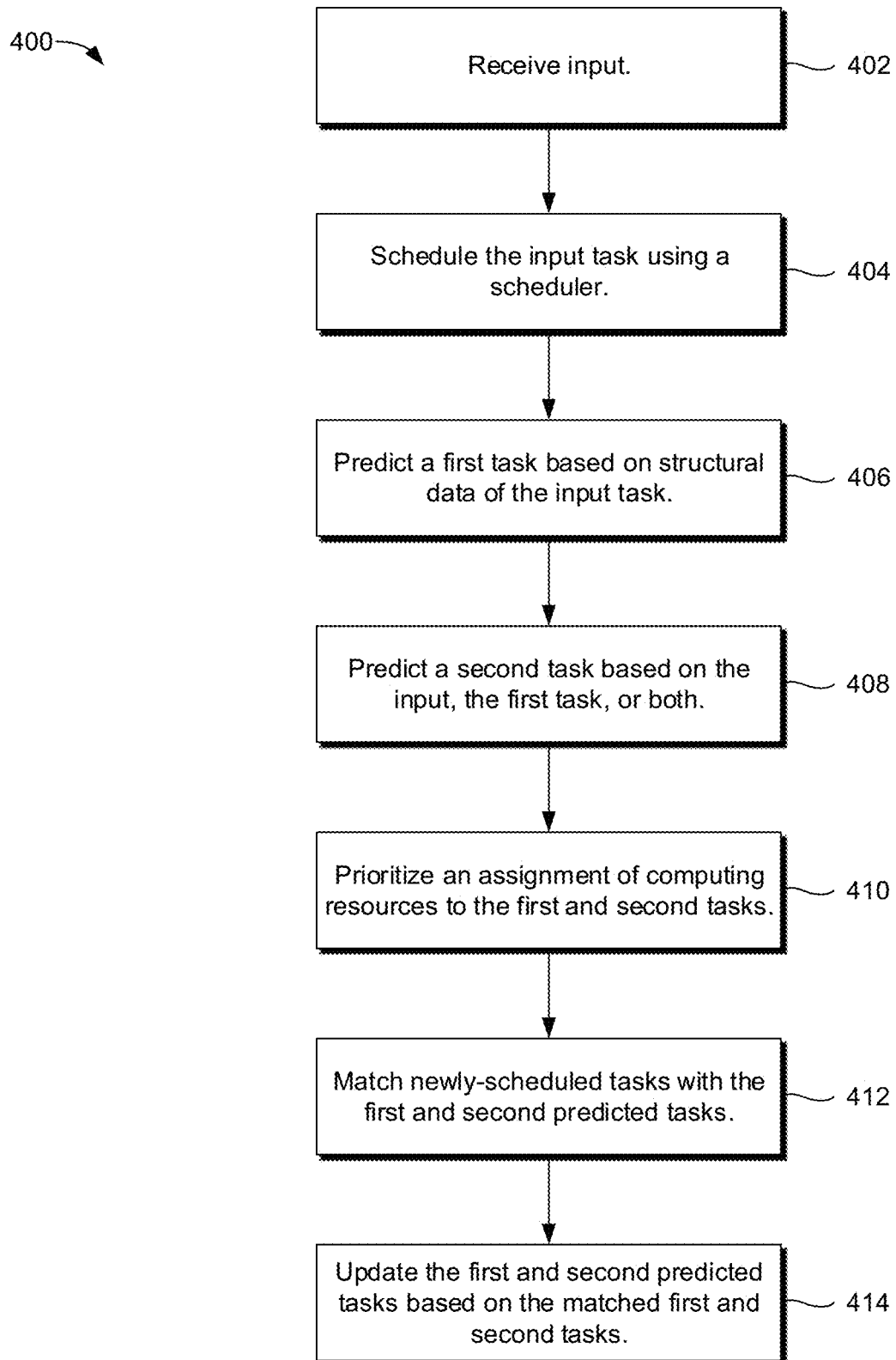
FIG. 4 illustrates a flowchart of a method for scheduling a task, according to an embodiment.

FIG. 4 illustrates a flowchart of a method 400 for scheduling a task, such as a task related to processing seismic shot data (although other types of tasks are within the scope of the present disclosure), according to an embodiment. The method 400 may include receiving an input, such as seismic input, collected using data acquisition equipment (e.g., a hydrophone or geophone), as at 402. In other embodiments, the input may be received from a persistent memory, or any other source.

The method 400 may also include scheduling an input task, as at 404. The input task may be executed by a network of computing resources (processors), as a or part of a distributed application. Accordingly, scheduling the input task at 404 may include determining when (relative to other tasks) and on what processing resources the input task is executed. Input tasks may be tasks in which the system receives, sorts, and/or stores data, e.g., the input received at 402. In some embodiments, the input tasks may be partitioned based on time, e.g., the seismic data acquired on a specified day in a series of days, as will be described below. In other embodiments, the input tasks may be partitioned based on other attributes, such as shot line number. The input tasks may be partitioned in any suitable manner, depending on the application.

The method 400 may also include predicting one or more first tasks based on the one or more input task, as at 406. This prediction may be concrete or general and may be made based attributes of the input, e.g., structural data related to the hardware (e.g., a marine seismic streamer) that acquires the data for the input task. Concrete predictions generally take place when circumstances allow for the system to predict precisely what tasks will occur in the future, based on the nature of the input and/or the hardware. General predictions, on the other hand, occur when the system predicts placeholder tasks, which may be scalable in number. With general predictions, the placeholder tasks may be converted to concrete predictions once a precursor task has been at least partially executed. As will be described in greater detail below, the precursor task results may provide the additional detail to the system that enables the system to determine the number of scheduled tasks correspond to the placeholder tasks. The placeholder tasks can then be split to arrive at the number of scheduled tasks. It will be appreciated that there may be several streams for first tasks, with some first tasks acting as precursor tasks for other first tasks.

The method 400 may include predicting one or more second tasks based on the one or more first tasks, as at 408. The second task may be part of a sequence of tasks that are preformed based on the predicted first task. For example, the results of two or more of the first tasks may be scheduled to be merged into a single one of the second tasks. Once the predictions have been completed, at 410, the method 400 may include using the predicted tasks to prioritize the assignment of computing resources to the various tasks, e.g., in a way that makes efficient use of network topology and facilitates combining of results from the execution of the tasks. For example, the first tasks that are predicted to be merged into a single one of the second computing tasks may be performed on nodes with fast connections therebetween, facilitating passing of results from the nodes that execute the first computing tasks to the nodes of the second computing tasks.

As the tasks are processed and subsequent tasks are scheduled, newly-scheduled tasks may be matched to placeholder tasks, as at 412, and the scheduling system updates the state of the predicted tasks, as at 414. For example, processing the input tasks may include determining an attribute for the first tasks. The attribute may specify, for example, a number of first tasks that may be scheduled to be completed, although the attribute could be any characteristic of the first tasks. As the attribute for the first tasks becomes known during the processing of the input tasks, the first tasks may be matched to the predicted first and second tasks.

Accordingly, embodiments of the present disclosure may include a task-scheduling engine that employs a graph-theoretic representation of points in an application in which tasks may be scheduled. The nodes in this graph may denote an application component, human, device, or other mechanism that can introduce processing tasks during the execution of a job. The graph of task scheduling points may be a directed graph, where the edges in the graph denote relationships between tasks scheduled on a source node and tasks scheduled on a sink node. This edge may be paired with a predictive kernel that can be used to estimate what tasks might be scheduled at the sink node. These estimated output tasks are then used by the system to predict resource scheduling for the parallel job.

Figure 5:
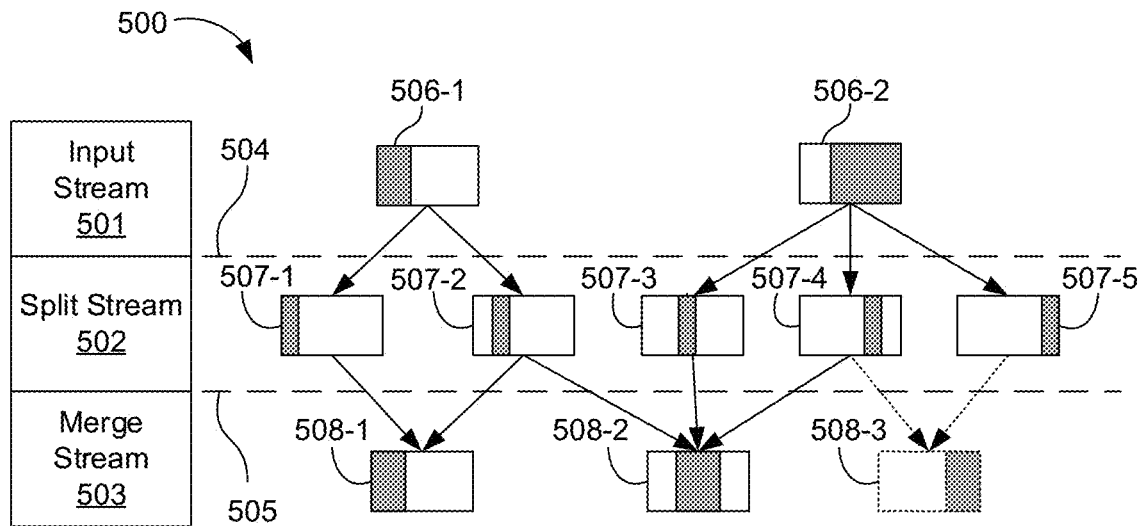
FIG. 5 illustrates a diagram of a task scheduling system, according to an embodiment.
Figure 6:
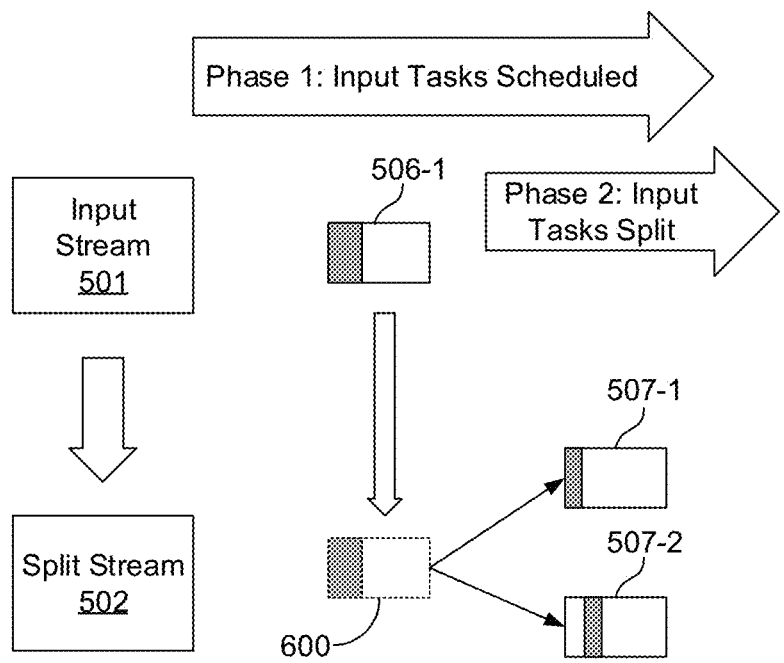
FIG. 6 illustrates another diagram of the task scheduling system, according to an embodiment.

FIGS. 5 and 6 illustrate two diagrams, conceptually depicting such a graph, according to an embodiment. In particular, FIG. 5 illustrates a diagram of a schedule for a job 500 including three task scheduling points, according to an embodiment. For example, the job 500 may be represented as a graph including three "streams" e.g., an input stream 501, split stream 502, and merge stream 503, with an edge 504 between the streams 501, 502, and another edge 505 between the streams 502, 503.

The right side of the diagram shows tasks scheduled in each stream 501-503. In this example, two input tasks 506-1, 506-2, five split tasks 507-1 to 507-5, and three merge tasks 508-1 to 508-3 are scheduled. Arrows between tasks indicate that a task is a precursor task to the task pointed to by the arrow. The edges 504, 505 between each task stream represent an application program interface (API) that predicts tasks corresponding to the input/precursor task. The filled-in portion of the boxes representing the tasks 506-1, 506-2, 507-1 to 507-5, and 508-1 to 508-3 illustrates a subset of the data for the entire job that belongs to the task. For example, on the input stream 501, most of the original seismic data corresponds to task 506-2, and the remainder corresponds to task 506-1. The predicted task is considered a placeholder or metatask and may correspond to one or more tasks scheduled on the given stream. Further, the merge task 508-3 is shown with dashed lines, which represent that a task that has been predicted by the scheduling engine but has not yet been scheduled.

FIG. 6 illustrates another diagram of the task scheduling system, showing the relationship between the input task 506-1 and the real scheduled tasks between the first two task streams 501, 502, according to an embodiment. Here, the input task 506-1 is scheduled during the first phase of the job 500, and a logical placeholder task 600 is created in the second stream 502 in response to scheduling the input task. Later, during phase two, the two split stream tasks 507-1, 507-2 are scheduled, which correspond to the specified input task 506-1. Thereafter, e.g., during phase three, these tasks 507-1, 507-2 may be executed as scheduled.

In some embodiments, the present disclosure may provide techniques for predicting tasks, e.g., in shot (seismic) processing applications. In the shot-processing example, the relationship between shot-processing tasks and common image point tasks may be predicted based on geometric criteria of individual shot processing tasks. For example, given a maximum acquisition offset, for any given common image point defined as a midpoint between shot and receiver locations, a given shot task may contribute to any common midpoint task within one half the maximum offset of the survey. Using information about the shot and common image point geometry, the common image point tasks may be predicted by the distributed processing system orchestrating task scheduling and assignment.

When the common image point tasks can be anticipated by an engine managing the processing tasks of the job, decisions may be made to prioritize the order in which the shot tasks are processed and the computing devices to which the shot processing tasks are assigned. These decisions may have an impact on the performance of the processing job by reducing the time required to transmit information between devices processing shots corresponding to the same output. In cases where shots are released from device memory when corresponding image point tasks have been completed, the prioritization of scheduled shots may substantially reduce the memory required to run the processing sequence over the available devices.

Figure 7:
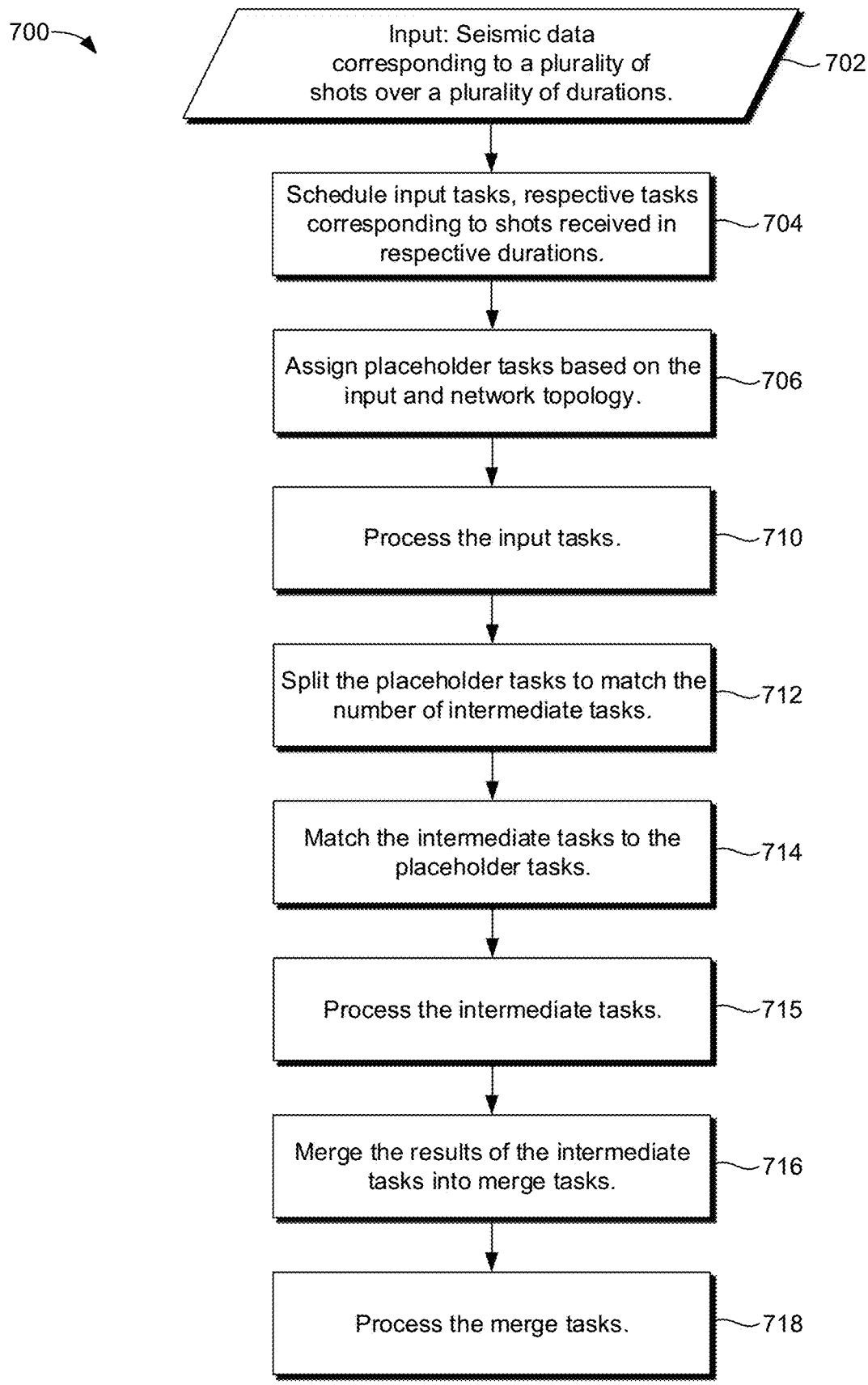
FIG. 7 illustrates a flowchart of another method for scheduling a task, according to an embodiment.

FIG. 7 illustrates a flowchart of another method 700 for scheduling a job, according to an embodiment. In general, the method 700 may include performing work on input tasks that correspond to the data acquired over a given duration. For example, the data collected over a day may be broken into smaller groups of data, e.g., individual shots. The shots may then be independently processed via distribution to a plurality of computing resources (nodes). After processing the individual shots, the shot data may be recombined into tasks including data acquired over a single day (duration). For example, the input tasks may be broken into intermediate shot tasks, which may then be combined, e.g., into "shot-day" tasks.

The method 700 may include, at 702, receiving as input, seismic data (e.g., marine seismic data) acquired over a series of time-durations. In some embodiments, receiving at 702 may include measuring the data in the field using one or more physical seismic data acquisition devices (e.g., hydrophones), as described above. In other embodiments, the method 700 may operate on data that was previously collected and stored.

To illustrate by way of a specific, non-limiting example, a 10-day period may be employed as the series of time durations, with individual days corresponding to individual durations of the series. During the individual days (durations), one or more shots may be acquired, with individual shots including one or more records or traces. Individual records or traces may represent a series of seismic reflections recorded at a particular location for the respective shot. In some examples, an individual shot may include hundreds of records or traces, and an individual day may include hundreds of shots. Attributes of the data may be known, prior to the data being processed, and the method 700 may, in some embodiments, employ that a priori knowledge to efficiently execute the tasks, e.g., as follows.

The computing resources available for the intermediate shot tasks (e.g., the shot-day jobs) may include, as an illustrative example, computing nodes indexed between 1 and 100, which may be broken into four groups, 1-25, 26-50, 51-75, and 76-100, with high connectivity between nodes in the same group, and slower connectivity between nodes in different groups. The method 700 includes scheduling input tasks, with the respective input tasks corresponding to shots received in respective durations (days), as at 704. This may occur before, during, or after the acquisition of the seismic data and/or before, during, or after receiving such data at 702. The scheduled input tasks may initiate the input stream; continuing with the present example, 10 input tasks may be scheduled in the stream, one for each day of shot data.

It will be appreciated that the specific number of computing nodes, numbers of shots, duration length, etc. is employed herein to facilitate an understanding of the disclosure, but is not intended to be limiting. Indeed, any duration length and any number of computing nodes could be employed.

The actual number of shots recorded in the individual days (durations) may be unknown at this point; thus, the method 700 may include assigning/creating placeholder tasks for the intermediate shot tasks (e.g., single-shot tasks), as at 706. Again, this may occur before, during, or after receiving the seismic input at 702. The placeholder tasks may be assigned at 706 based at least in part on a prediction of the number of intermediate tasks that may be called for.

In some embodiments, the method 700 may employ implementation details that allow for the prediction of the number of intermediate tasks at 706. In an embodiment, such implementation details may include task attributes for the tasks scheduled. For example, the individual tasks may have an attribute of a shot line number corresponding to a physical line of shots. On the split stream, the individual tasks may have two attributes: the first corresponding to the existing shot line number from the input task stream, and the second corresponding to a shot index representing a single shot in the shot line.

The placeholder task may be created in the split stream with the same shot line index as input, along with a wildcard for the shot index. A task scheduled on the split stream with the same shot line index, can thus be associated with the correct placeholder task. Other attributes can be used as well. In some embodiments, the wildcard may be an out-of-set value. An "out-of-set value" in this context is a value of an attribute that logically evaluates to being outside the set (e.g., greater than) of the potential values of the attribute. Thus, the attributes may be any for which the potential values are a partially ordered set. In this way, execution of the method 700 may allow for the prediction of placeholder tasks by substituting the value of the out-of-set value for attribute values on the split stream that do not correspond to known attributes from the input task. In some embodiments, the method 700 may include providing further logic to decompose (or combine) input attributes. This task prediction framework can then be combined with heuristics, dependent on the parallel engine, to schedule tasks.

These placeholder tasks may also be used to predict the subsequent shot-day (merge stream) tasks resulting from recombining the individual intermediate tasks. In this case, however, the scheduling engine can predict that there will be 10 shot-day tasks later during execution. In other situations, the number of merge stream tasks may not be the same as the number of input stream tasks scheduled, and, further, split stream tasks from one input task may be inputted into two or more merge stream tasks, as shown in FIG. 5.

Because the scheduling system has predicted that input tasks will be broken into many smaller tasks, and then recombined, the method 700 may include scheduling the input tasks across the nodes according to the available network topology. For example, input task 1 goes to node 1, input task 2 goes to node 26, input task 3 goes to node 51, input task 4 to node 76, input task 5 goes to node 2, etc.

As input tasks are processed, as at 710, the system may be able to update the an attribute of the intermediate tasks, which may provide the number of intermediate tasks to be scheduled. Accordingly, the placeholder tasks may be split, as at 712, to match the number of intermediate tasks to schedule, and then the intermediate tasks may be scheduled by matching with the placeholder tasks, as at 714. Processing the input tasks may include converting data from the representation of an acquisition system to a representation for a subsequence processing activity.

The method 700 may include processing the intermediate tasks, as at 715, which may include applying time-domain processing comprising one or more of filtering, amplitude normalization, or coherent noise attenuation.

For example, if input task 1 results in 150 intermediate shot tasks, since these shot tasks may be recombined into a single final task, the method 700 may include scheduling the 150 intermediate tasks corresponding to input task 1 to compute nodes in the same network topology group as input task 1. Specifically, the 150 tasks corresponding to input 1 may be scheduled on nodes 1 to 25. Correspondingly, the tasks corresponding to input task 2 may be scheduled on nodes 26 to 50, which correspond to the location input task 2 was assigned. In this way, the scheduler allows the distributed job to take advantage of the interconnected topology in each of the node groups. Once the tasks corresponding to a split task stream are completed, they may be combined at 716. The combined/merged split tasks may then be used as precursors for merge tasks, which may be processed at 718. Processing the one or more merge tasks may include processing in a non-time domain, or generating an image to check the quality of the data.

Figure 8A:
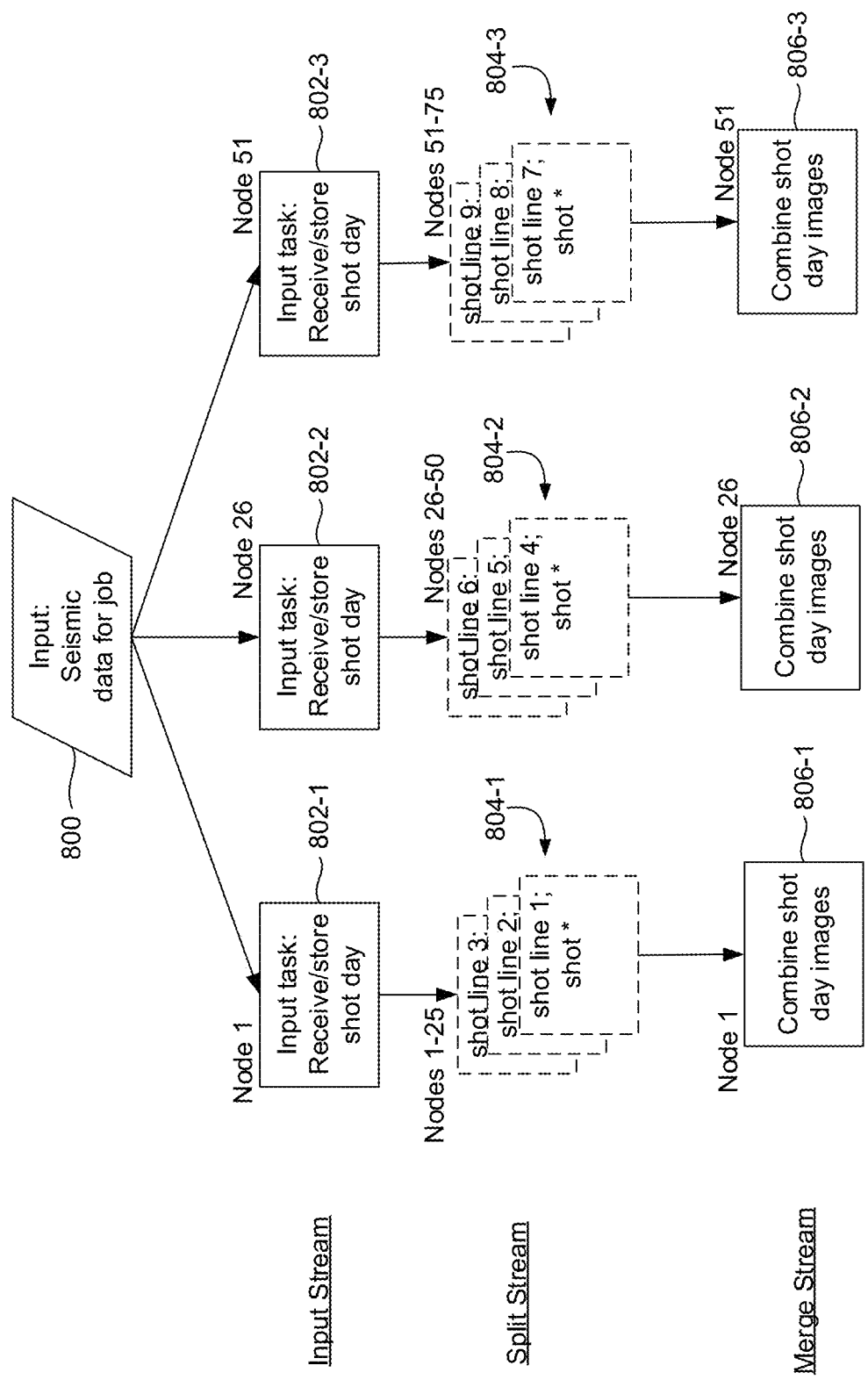
FIGS. 8A and 8B illustrate diagrams of an implementation of a method for scheduling a task, according to an embodiment.
Figure 8B:
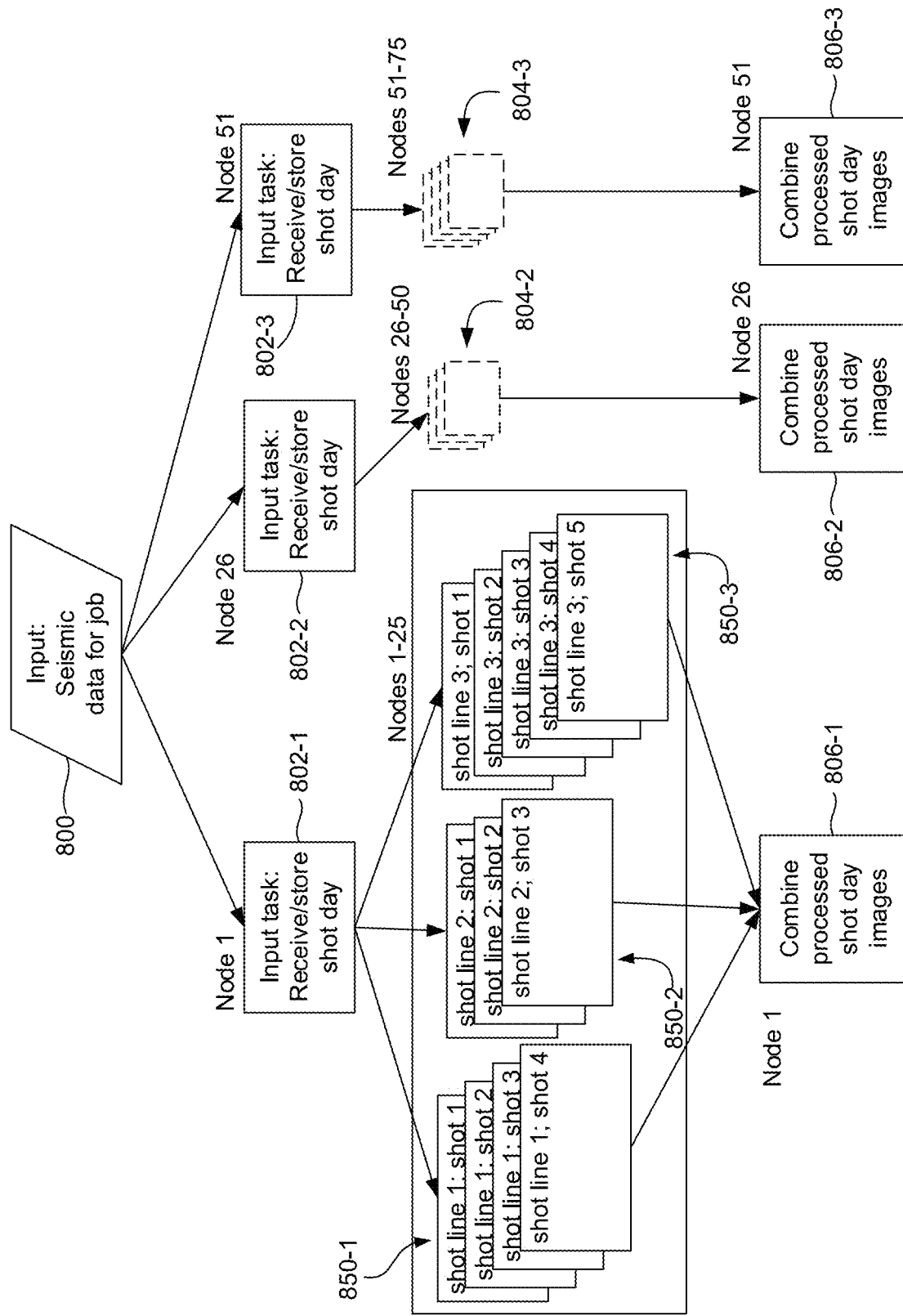

FIGS. 8A and 8B illustrate a diagram of a specific implementation of an embodiment of the method 700. In describing FIGS. 8A and 8B, reference is also made to the flowchart of FIG. 7.

Beginning with FIG. 8A, there is illustrated a first phase of the method 700. The seismic data may be received as input at 800, corresponding to box 702 of the method 700. The method 700 may proceed to scheduling input tasks 802-1, 802-2, and 802-3 e.g., in nodes of different node groups, corresponding to box 704 of the method 700. Continuing with the example from above, input tasks 802-1, 802-2, 802-3 may be associated with shots received in different durations, on different shot lines, etc. The input tasks 802-1, 802-2, 802-3 may be scheduled based on the network topology. For example, the input task 802-1 may be scheduled on one (or more) of the nodes indexed at 1-25 (e.g., node 1), the input task 802-2 may be scheduled on one (or more) of the nodes indexed at 26-50 (e.g., node 26), and the input task 802-3 may be scheduled on one (or more) of the nodes indexed at 51-75 (e.g., node 51). The tasks 802-1, 802-2, and 802-3 may be the input stream.

Placeholder tasks 804-1, 804-2, 804-3 may be scheduled in the split stream, e.g., on nodes in the groups corresponding to the node groups in which the respective input tasks are scheduled. For example, placeholder tasks 804-1 may be scheduled on one or more of nodes 1-25, placeholder tasks 804-2 may be scheduled on one or more of nodes 26-50, and placeholder tasks 804-3 may be scheduled on one or more of nodes 51-75. The individual placeholder tasks 804-1, 804-2, 804-3 may have two or more attributes. One of the attributes may be predictable based on the acquisition system, e.g., the shot line number, or the shot day, etc. The other attribute may be unknown until after the data is input, e.g., the shot number, as the number of shots may be unknown. A wildcard '*' may be employed as discussed above for this second attribute.

The method 700 may also schedule merge stream tasks 806-1, 806-2, and 806-3, which may take the output from two or more of the split string tasks 804-1, 804-2, 804-3 and combine them, e.g., to produce an image of seismic domain from several shots or even two or more shot days.

The input tasks 802-1, 802-2, and 802-3 may serve as precursor tasks to the split stream tasks; that is, before the placeholder tasks 804-1, 804-2, 804-3 are converted into scheduled tasks, the input/precursor tasks 802-1, 802-2, 802-3 may be at least partially executed. For example, execution of the input tasks 802-1, 802-2, 802-3 may provide the missing information for the system to schedule the correct number of split stream tasks (e.g., in this case, the number of shots in the respective lines). Proceeding to FIG. 8B, the input task 802-1 may be at least partially processed, corresponding to box 710 of FIG. 7, which may provide the knowledge that there are 4 shots in shot line 1, 3 shots in shot line 2, and 5 shots in shot line 3. Corresponding new tasks 850-1, 850-2, 850-3 may thus be scheduled in the split stream by splitting the placeholder tasks at 712 and matching the new tasks to the placeholder tasks at 714. The same or similar sequence may occur for the placeholder tasks 804-2, 804-3 once the input tasks 802-2, 802-3 are at least partially executed.

It will be appreciated that there may be more than one split stream. For example, there may be three or more attributes, at least two of which are unknown and represented with wildcards. The input tasks 802-1, 802-2, 802-3 may serve as precursor tasks for two or more such split streams, and/or one split stream task may serve as a precursor for a subsequent split stream task.

Figure 9:
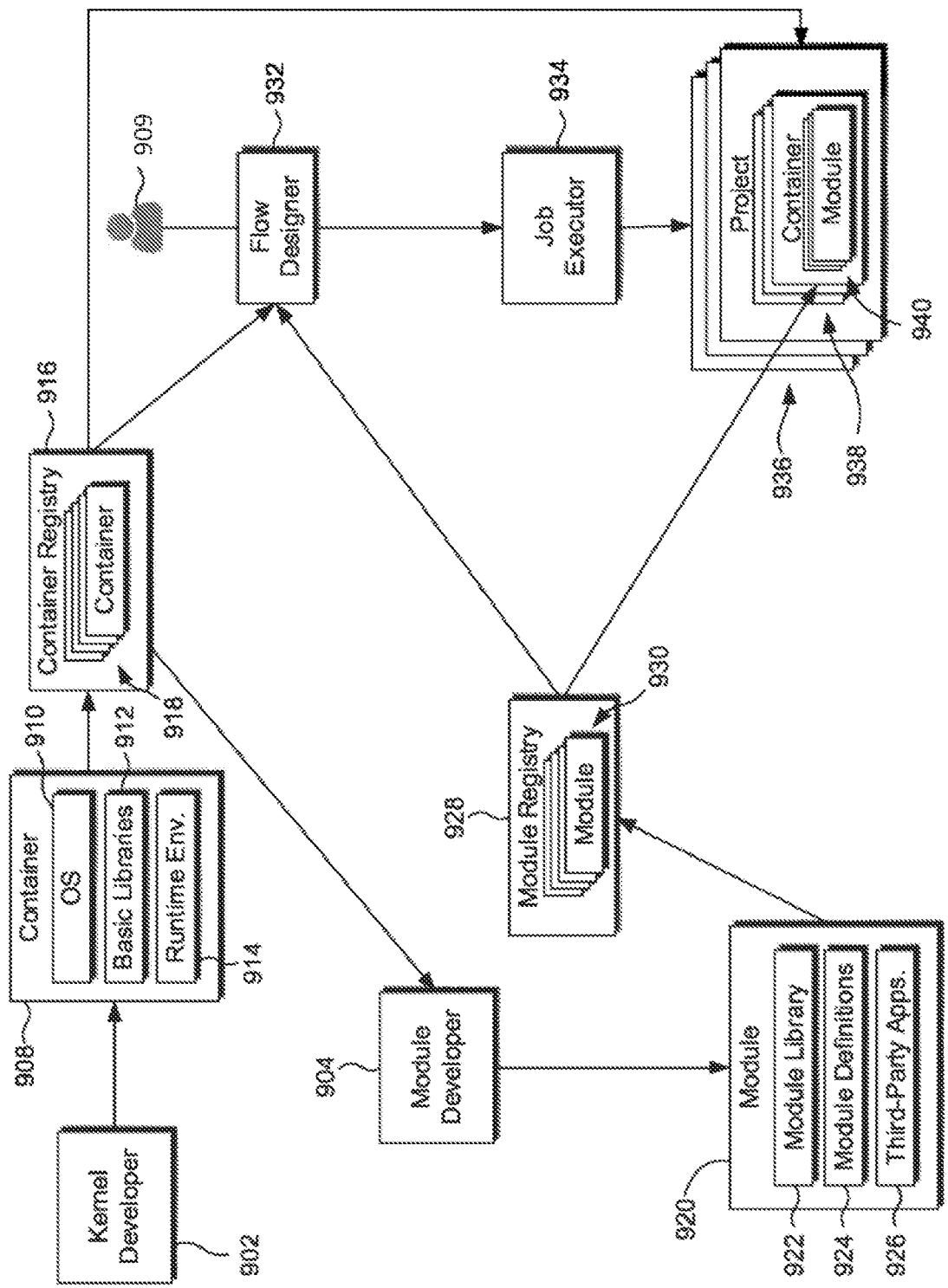
FIG. 9 illustrates a diagram of a system for distributed computing, according to an embodiment.

FIG. 9 illustrates a conceptual diagram of a computing system 900 that may be employed to execute an embodiment of any one of the foregoing methods, and/or others, in a distributed context. The system 900 employs containers, which facilitate encapsulation of the functions of the kernel developers 902, the module developers 904, the service providers 906, and the "user" 908 (e.g., the human/group of humans who are responsible for creating workflows to be implemented in testing, production, or both).

A container is an executable package of software that may include one or more of code, runtime environment, system tools, libraries, and settings. The container may be loaded into an execution environment (e.g., a virtual machine) and may be run, generally without regard for the specifics of the system that is doing the executing. Thus, the containers isolate the software from its surroundings, and consequences of differences between development and staging environments may be reduced or avoided. This may facilitate changing the system 900, e.g., reducing coordination between the different teams.

In the illustrated embodiment, the kernel developers 902 create runtime environment images, e.g., the containers 908. In some embodiments, the containers 908 may be a blade runtime environment. Individual containers 908 may include the basic functionality used to execute software applications or "modules" that are used to execute the flows designed by the user 909. Individual containers 908 may thus include an operating system kernel 910, such as a LINUX® distribution, e.g., centOS. The containers 908 may also include one or more basic libraries 912 and a runtime environment 914. A variety of other software applications may be included in the container 908.

When developed by the kernel developer 902, the containers 908 may be published to a container registry 916, which may include several such containers (collectively labeled 918). The containers 918 in the registry 916 may be available for use by the module developers 904. In turn, the module developers 904 may generate modules 920, which may be packages of software that are configured to perform tasks that are relevant to the flows to be generated, e.g., seismic processing tasks. The modules 920 may thus include libraries 922, module definitions 924, any third-party software (e.g., open-source) 926 that may be called for to complete a specified task, and/or any other software tools. The modules 928 may be published to a module registry 928, which may contain several such modules (collectively labeled 930).

The user 909 may interact with a flow designer 932, which may be a development environment that allows the user to employ the functionality of the modules 930 and the extensibility and encapsulation of the containers 918 to execute computationally-intensive workflows in a distributed system. The flow designer 932 may be able to collect container information from the container registry 916, as well as module information from the module registry 928. Using this information, the flow designer 932 may facilitate creation of flow files that specify a series of tasks to be accomplished as part of a job. The flow files (i.e., the job) may then be passed to a job executor 934, which may instantiate and schedule one or more of such jobs as projects 936 using containers 938 and associated modules 940, as called for by the flows developed by the user 908 using the flow designer 932.

Accordingly, encapsulation is provided between the various entities. The (e.g., virtual) machines that implement the projects 936 do so by executing the containers 938, and the modules 940 are executed within the containers 938. Users 909 employ the modules 940, but may not have transparency to changes in the way the modules 940 operate. This is controlled by the module developers 904. Likewise, the modules 940 being executed by the containers 938 may not have awareness of changes to the kernel of the container 938. Thus, changes in the container 938, so long as the functionality remains the same, may not be seen by the modules 940, and changes in the modules 940, so long as functionality remains the same, may not affect their use in the flow design by the user 908.

Figure 10:
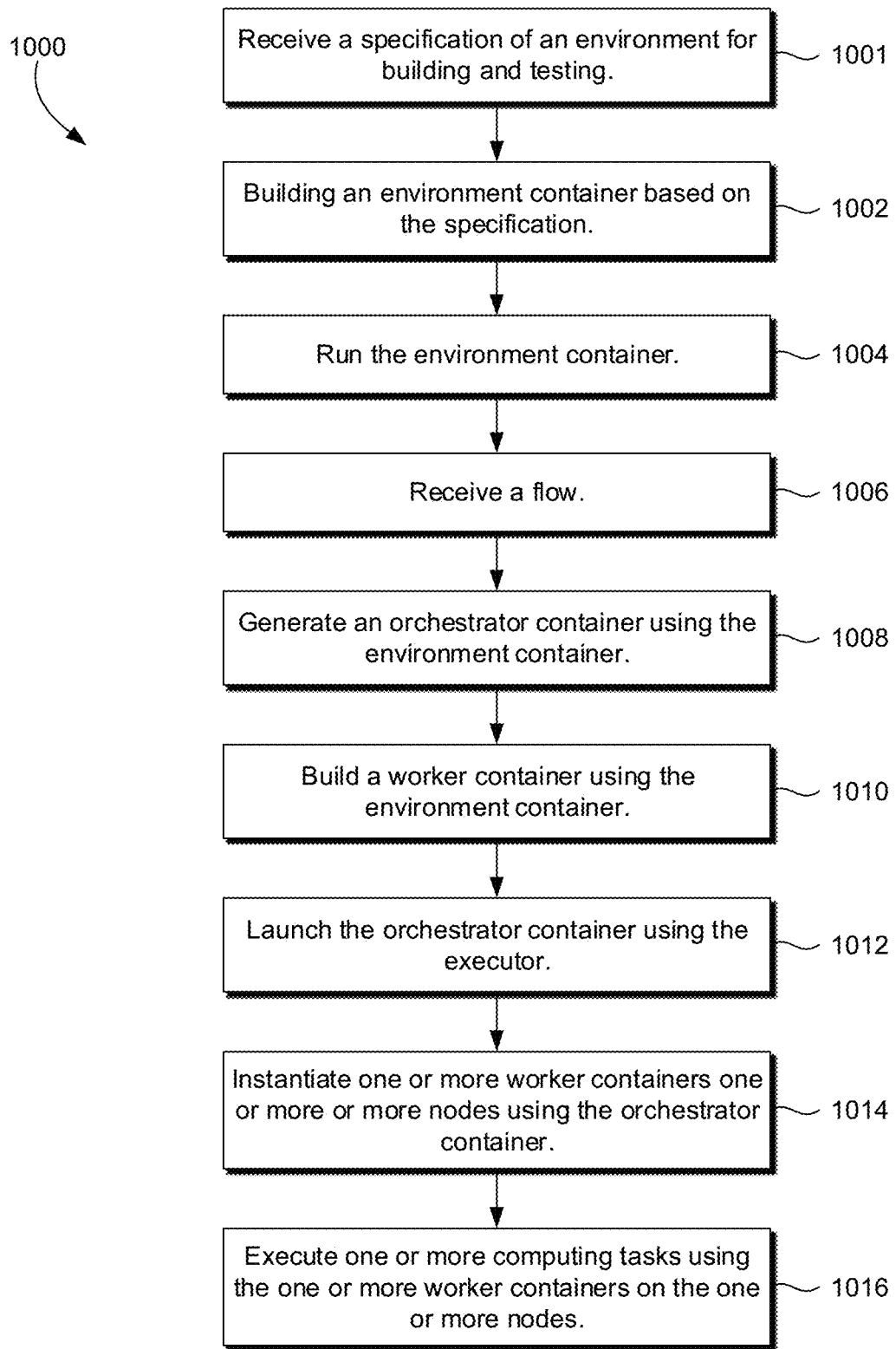
FIG. 10 illustrates a flowchart of a method for building, publishing, and executing a project using the distributed computing system of FIG. 9, according to an embodiment.

FIG. 10 illustrates a flowchart of a method 1000 for building a project, such as a seismic processing project, using the system 900, according to an embodiment. The method 1000 may include receiving a specification of an environment for building and testing, as at 1001. The method 1000 may also include building an environment container based on the specification, as at 1002. For example, a user may generate a file that specifies an environment for building and testing.

The environment container may then be run, as at 1004. A flow may then be received into the environment, as at 1006. The method 1000 may then include generating an orchestrator container as at 1008 and building a worker container 1010. In general, an orchestrator container may be configured to instantiate one or more worker containers one or more computing nodes, e.g., across a distributed computing/cloud system. The orchestrator container may control the tasks that are sent to or otherwise scheduled on the nodes, which, in turn, may execute the tasks using the worker containers. Once the containers are created, the containers may be published to the container registry 916, as explained above.

The method 1000 may include launching the orchestrator container, as at 1012. This may be conducted, e.g., using the job executor 934. The orchestrator container may include a node service application, which may be configured to communicate with worker nodes instantiated on the computing nodes.

The method 1000 may also include creating a worker instance template from the container, as at 1014. The method 1000 may further include instantiating one or more worker containers on one or more nodes using the orchestrator container, as at 1016. The orchestrator container and the worker containers may be stored in the container registry 916. The method 1000 may then include executing one or more tasks on the one or more computing nodes using the worker containers, as at 1016. The orchestrator container and the worker containers may include node service applications, which may enable communication between the containers. Accordingly, the orchestrator node may distribute computing tasks to the worker nodes, provide input thereto, and/or receive output therefrom.

Figure 11:
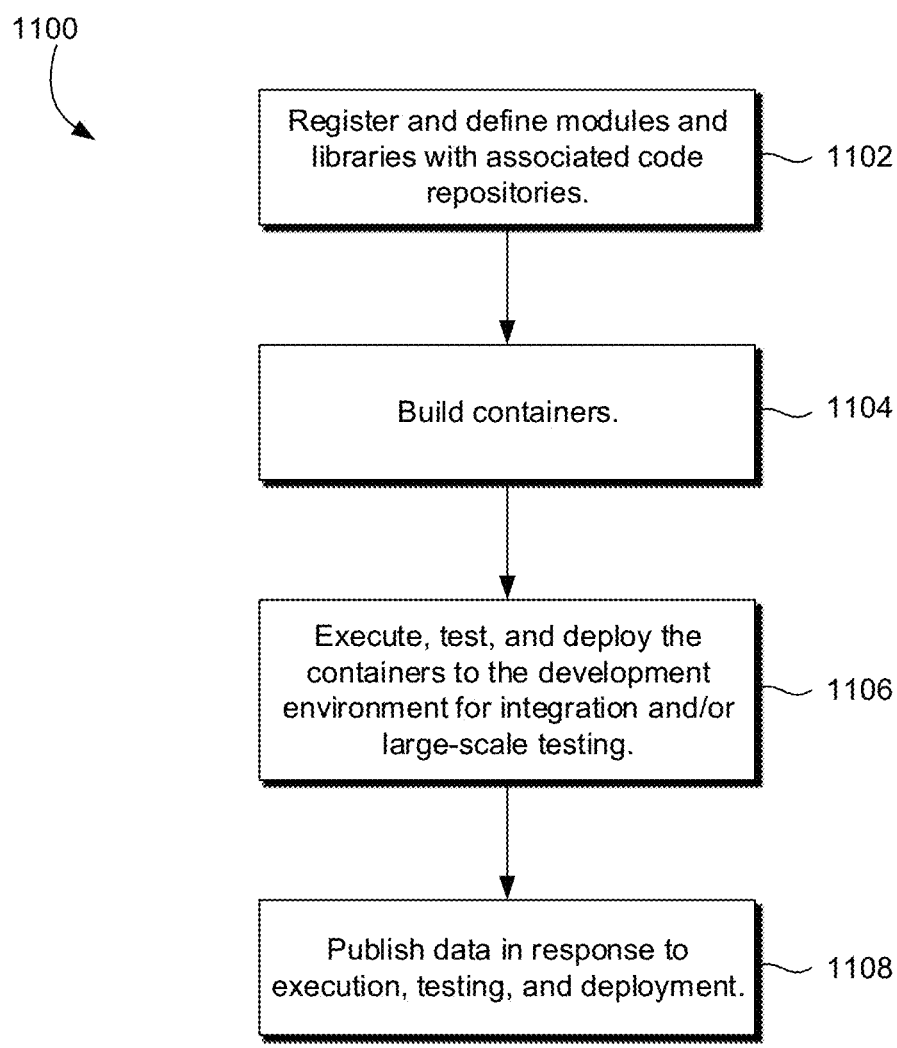
FIG. 11 illustrates a flowchart of a method for populating a module registry of the system of FIG. 9, according to an embodiment.
Figure 12A:
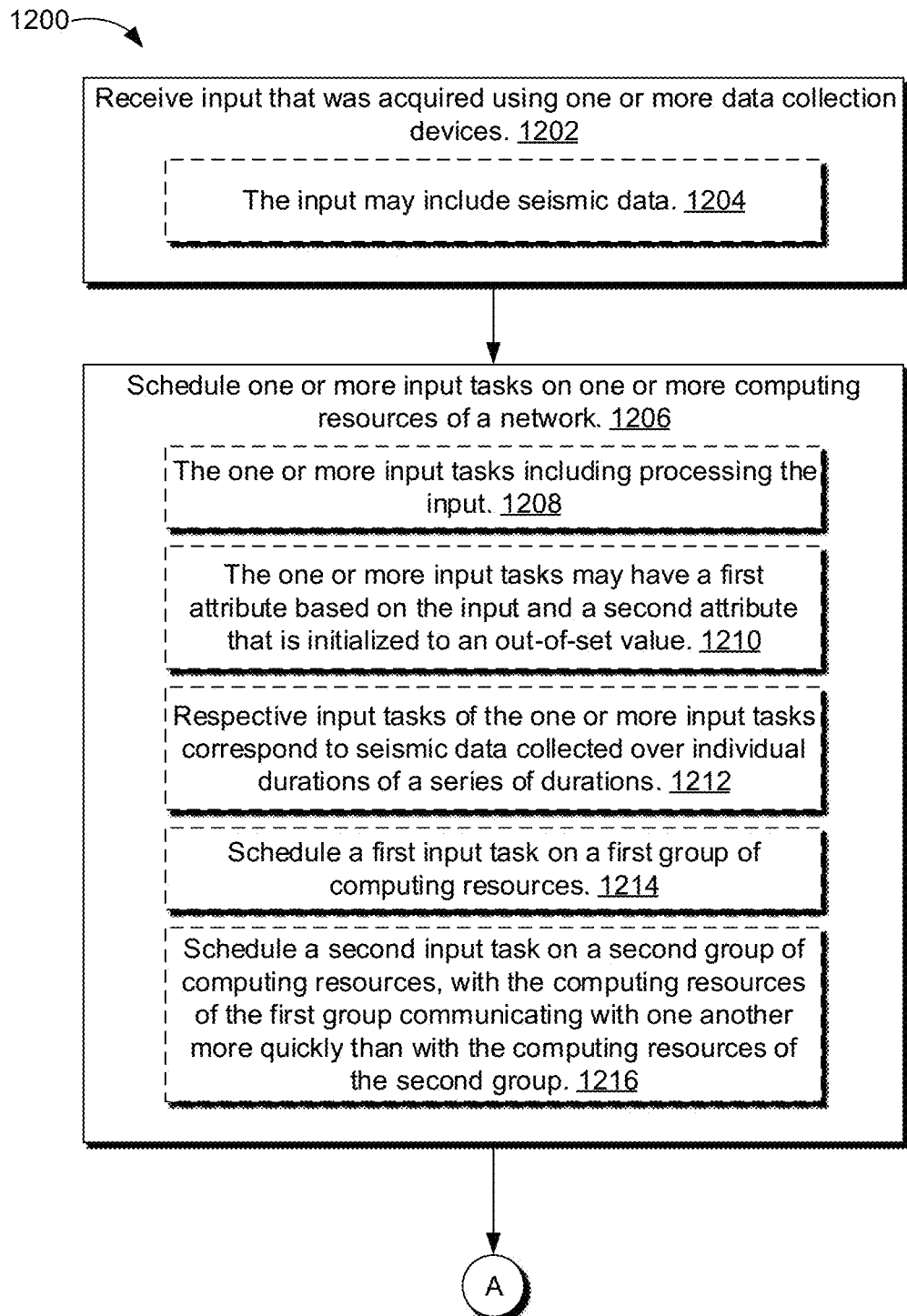
FIGS. 12A, 12B, 12C, 12D, and 12E illustrate a flowchart of another method for scheduling a task, according to an embodiment.
Figure 12B:
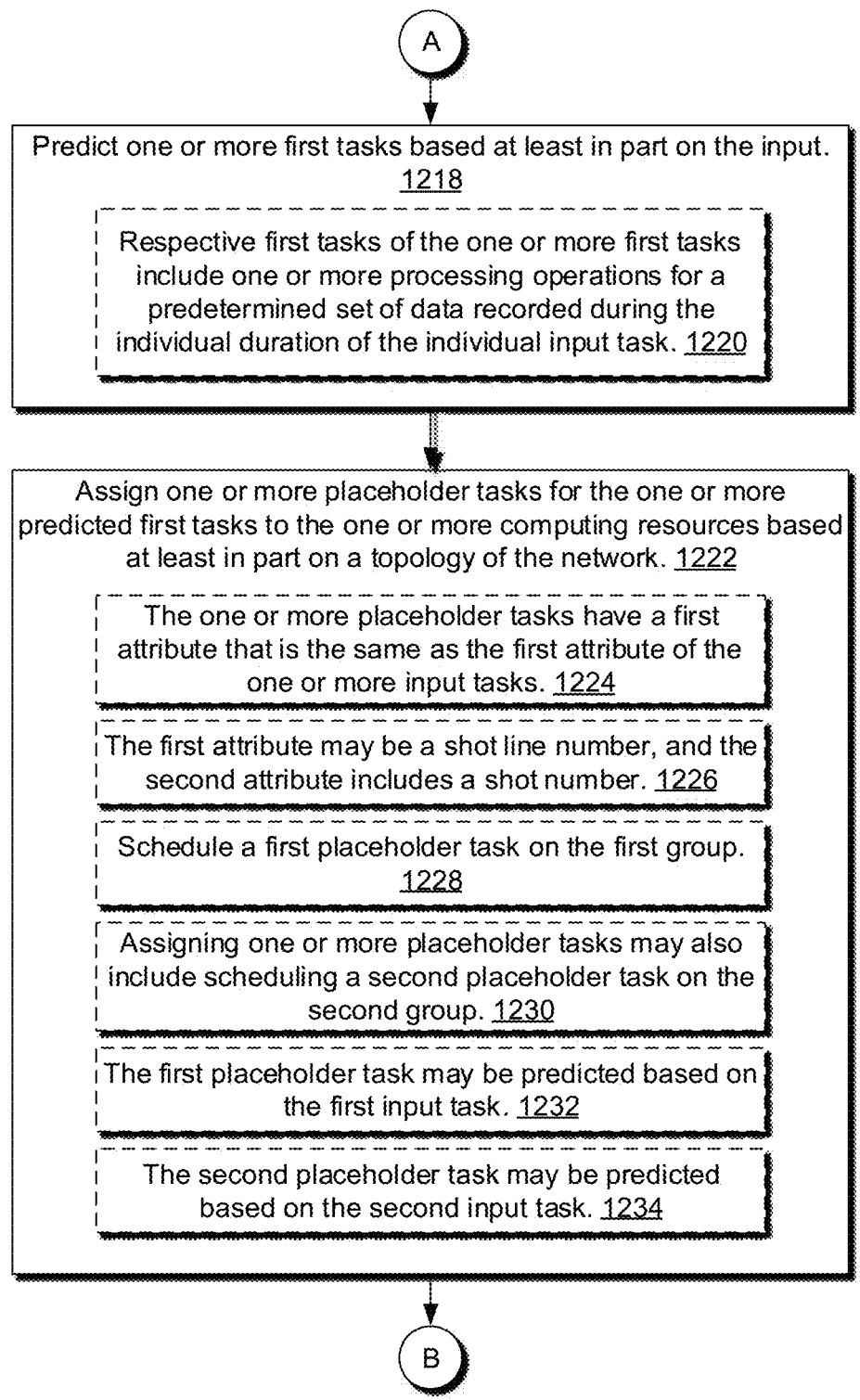
Figure 12C:
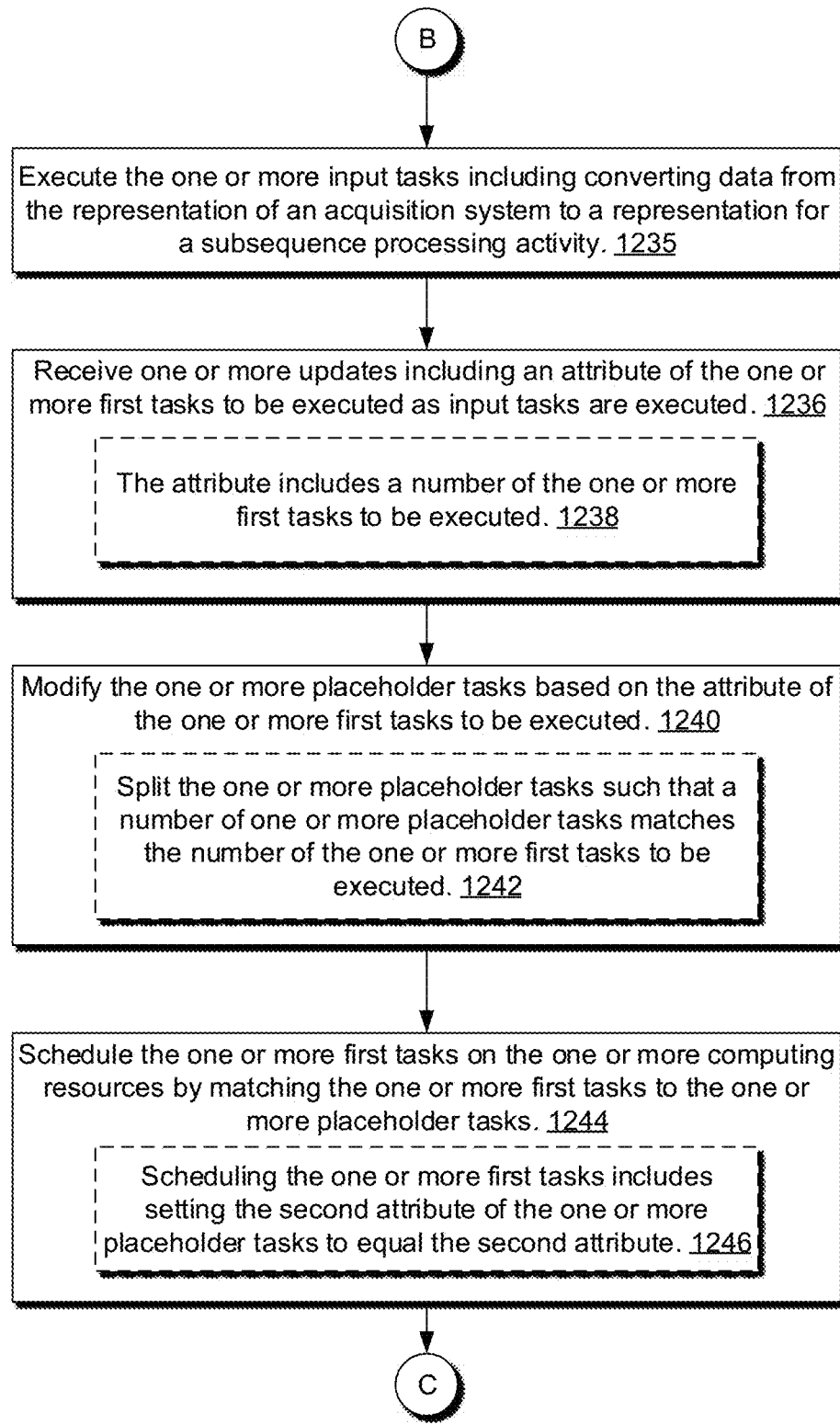
Figure 12D:
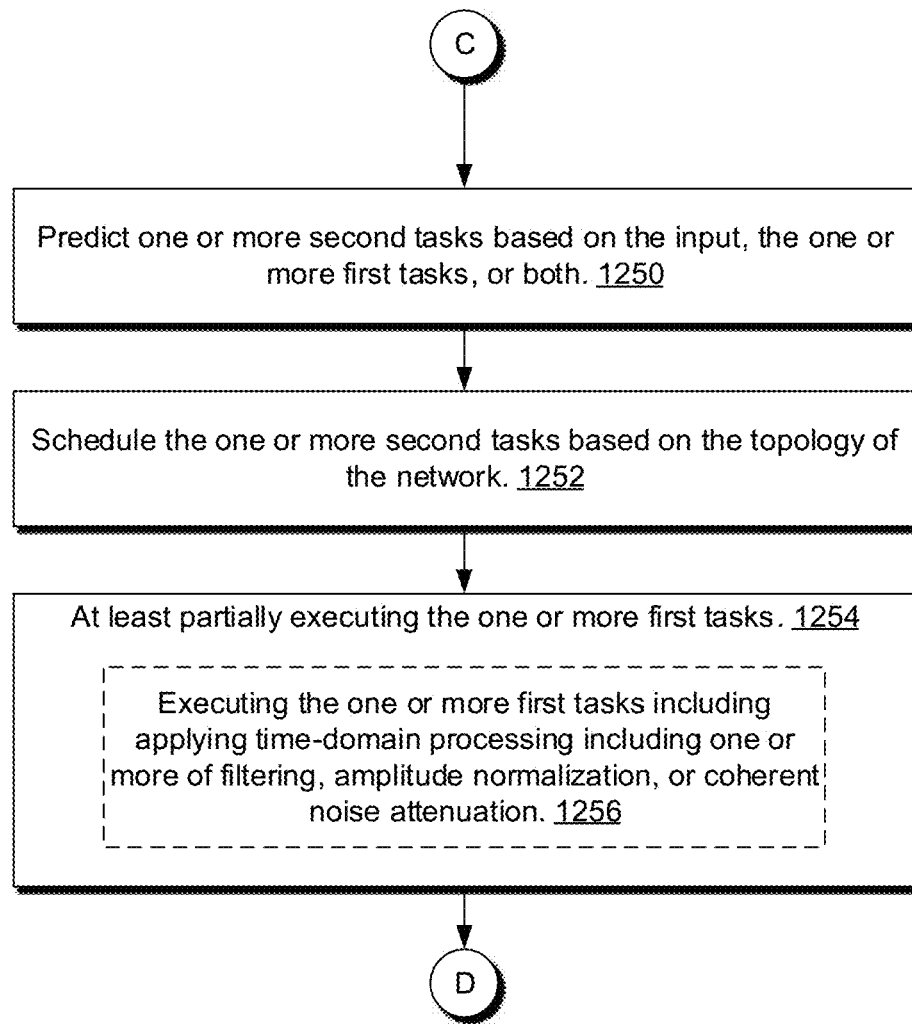
Figure 12E:
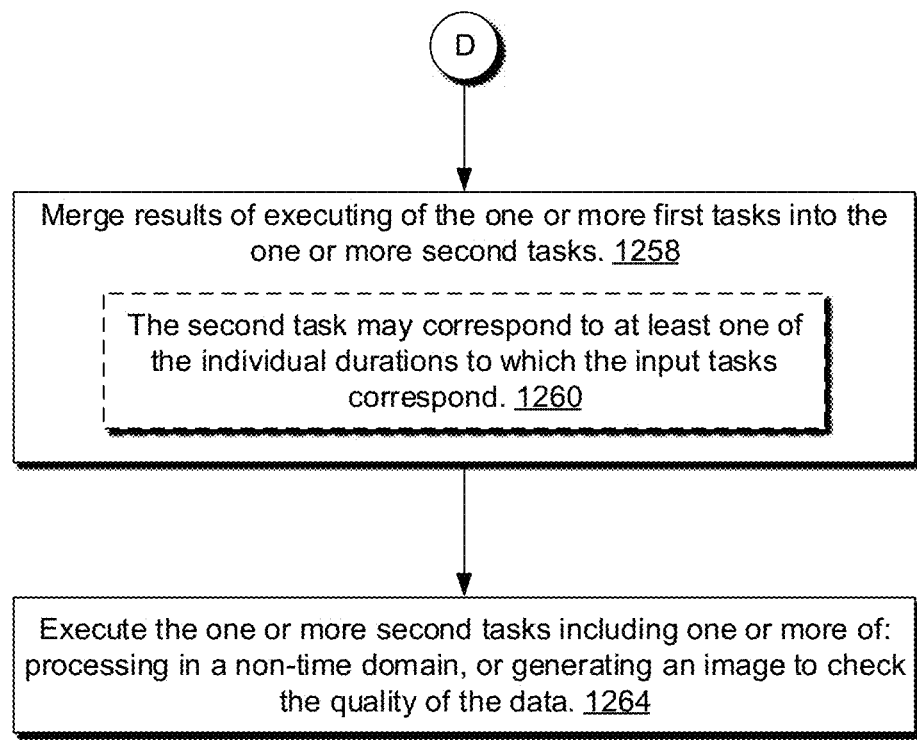

FIG. 11 illustrates a flowchart of a method 1100 for populating the module registry 928 (e.g., generating and publishing modules 920), according to an embodiment. The method 1100 may include registering and defining modules and libraries with associated code repositories, as at 1102. The method 1100 may also include building containers, as at 1104. The containers may be tested and deployed into a development and/or staging environment, e.g., for integration and/or large-scale testing, as at 1106. The registry 928 may have knowledge about flows that were executed on the system 900, which may allow the method 1100 to include publish data in response to executing, testing, and deployment of the containers and modules, as at 1108. This may assist in performing impact analysis for new module versions and support automatic conversion for compatible versions.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

FIGS. 12A-12E illustrate a flowchart of a method 1200 for scheduling tasks, according to an embodiment. The method 1200 may include receiving input that was acquired using one or more data collection devices, as at 1202 (e.g., 702, FIG. 7). In an embodiment, receiving input from the data collection device may include receiving seismic data, as at 1204 (e.g., 702, FIG. 7).

The method 1200 may also include scheduling one or more input tasks on one or more computing resources of a network (e.g., 704, FIG. 7). The one or more input tasks may include processing the input, as at 1208. The one or more input tasks may, in some embodiments, have a first attribute based on the input and a second attribute that is initialized to an out-of-set value, as at 1210. In an embodiment, respective input tasks of the one or more input tasks correspond to seismic data collected over individual durations of a series of durations, as at 1212 (e.g., 802-1, FIG. 8A). In an embodiment, scheduling the one or more input tasks includes scheduling a first input task on a first group of computing resources (e.g., 802-1, FIG. 8A, showing the input task scheduled on a first set of nodes), as at 1214. Scheduling the one or more input tasks may also include scheduling a second input task on a second group of computing resources, with the computing resources of the first group communicating with one another more quickly than with the computing resources of the second group, as at 1216 (e.g., 802-2, FIG. 8B, showing the input task scheduled on a second set of nodes).

The method 1200 may further include predicting one or more first tasks based at least in part on the input, as at 1218 (e.g., 706, FIG. 7, the placeholder tasks are assigned based on the prediction of the one or more tasks). In an embodiment, respective first tasks of the one or more first tasks may include one or more processing operations for a predetermined set of data recorded during the individual duration of the individual input task, as at 1220 (e.g., 804-1, FIG. 8A).

The method 1200 may further include assigning one or more placeholder tasks for the one or more predicted first tasks to the one or more computing resources based at least in part on a topology of the network, as at 1222 (e.g., 706, FIG. 7, assigning the placeholder tasks). The one or more placeholder tasks have a first attribute that is the same as the first attribute of the one or more input tasks, as at 1224 (e.g., 804-1, FIG. 8A, the shot line numbers are assigned based on the shot lines acquired during a shot day). The first attribute may be a shot line number, and the second attribute may include a shot number, as at 1226 (e.g., 804-1, FIG. 8A). Assigning the one or more placeholder tasks may include scheduling a first placeholder task on the first group, as at 1228 (e.g., 804-1, FIG. 8A, assigned to a first group of nodes). Assigning one or more placeholder tasks may also include scheduling a second placeholder task on the second group, as at 1230 (e.g., 804-2, FIG. 8A, assigned to a second group of nodes). The first placeholder task may be predicted based on the first input task, as at 1232. The second placeholder task may be predicted based on the second input task, as at 1234.

In an embodiment, the method 1200 may include executing the one or more input tasks including converting data from the representation of an acquisition system to a representation for a subsequence processing activity, as at 1235 (e.g., 710, FIG. 7). The method 1200 may also include receiving one or more updates including an attribute of the one or more first tasks to be executed as input tasks are executed, as at 1236 (e.g., 710, FIG. 7, as the input task is processed, updates to an attribute, such as the number of placeholder tasks, is determined). In an embodiment, the attribute includes a number of the one or more first tasks to be executed, as at 1238.

The method 1200 may further include modifying the one or more placeholder tasks based on the attribute of the one or more first tasks to be executed, as at 1240 (e.g., 712, FIG. 7, splitting the placeholder tasks is an example of modifying the attribute of the placeholder tasks, where the attribute is the number of placeholder tasks). In an embodiment, modifying the one or more placeholder tasks includes splitting the one or more placeholder tasks such that a number of one or more placeholder tasks matches the number of the one or more first tasks to be executed, as at 1242 (e.g., 712, FIG. 7).

The method 1200 may also include scheduling the one or more first tasks on the one or more computing resources by matching the one or more first tasks to the one or more placeholder tasks, as at 1244 (e.g., 412, FIG. 4; 714, FIG. 7). Scheduling the one or more first tasks may include setting the second attribute of the one or more placeholder tasks to equal the second attribute, as at 1246 (e.g., 851-1, FIG. 8B).

In an embodiment, the method 1200 may also include predicting one or more second tasks based on the input, the one or more first tasks, or both, as at 1250 (e.g., 716, FIG. 7, the merge tasks are predicted based on the processing of the intermediate tasks). The method 1200 may also include scheduling the one or more second tasks based on the topology of the network, as at 1252.

The method 1200 may further include at least partially executing the one or more first tasks, as at 1254 (e.g., 715, FIG. 7). In an embodiment, executing the one or more first tasks including applying time-domain processing including one or more of filtering, amplitude normalization, or coherent noise attenuation, as at 1256.

The method 1200 may also include merging results of executing of the one or more first tasks into the one or more second tasks, as at 1258 (e.g., 716, FIG. 7). The second task may correspond to at least one of the individual durations to which the input tasks correspond, as at 1260 (e.g., 806-1, FIG. 8A).

The method 1200 may also include executing the one or more second tasks including one or more of: processing in a non-time domain, or generating an image to check the quality of the data, as at 1264.

Figure 13A:
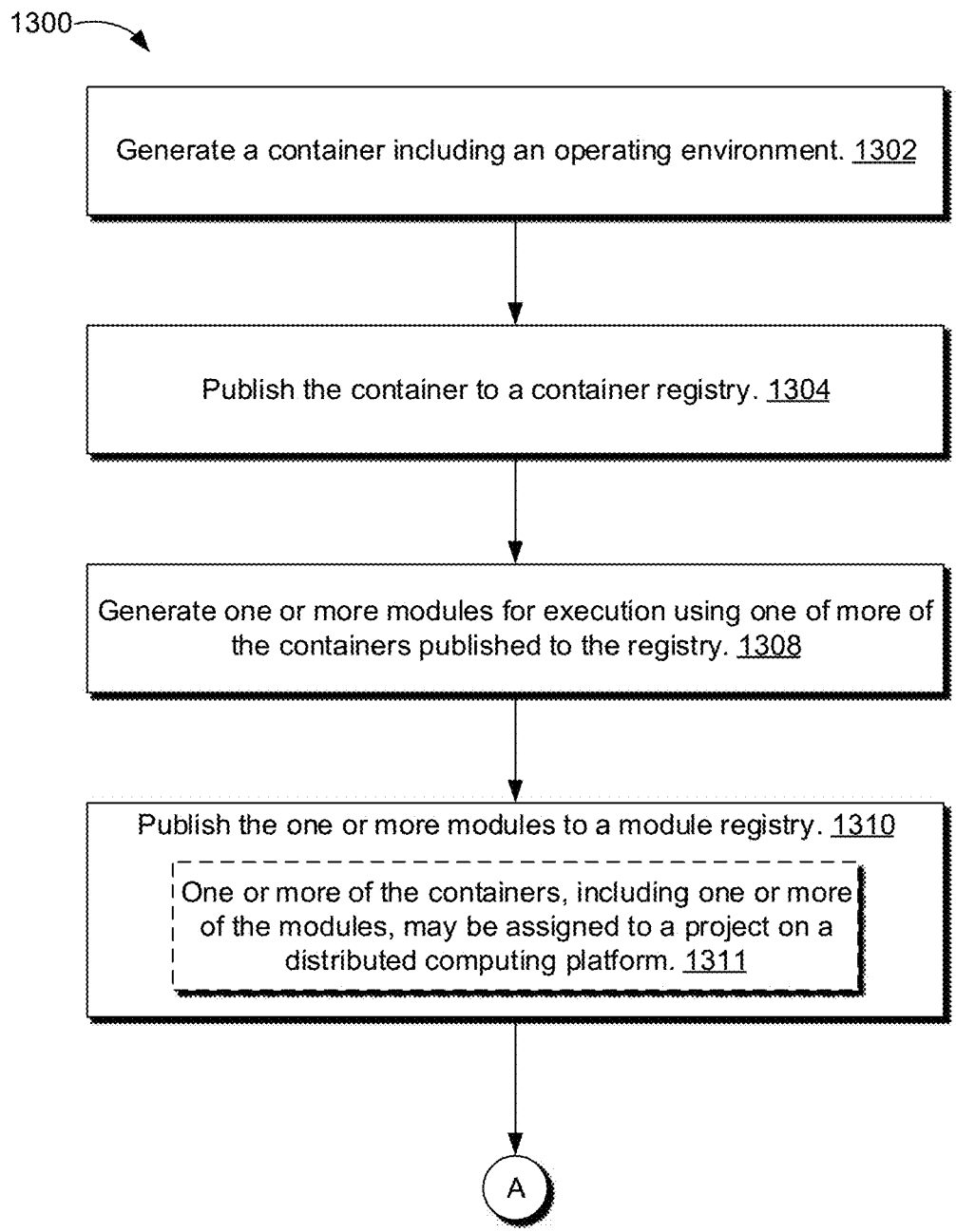
FIGS. 13A and 13B illustrate a flowchart of another method, according to an embodiment.
Figure 13B:
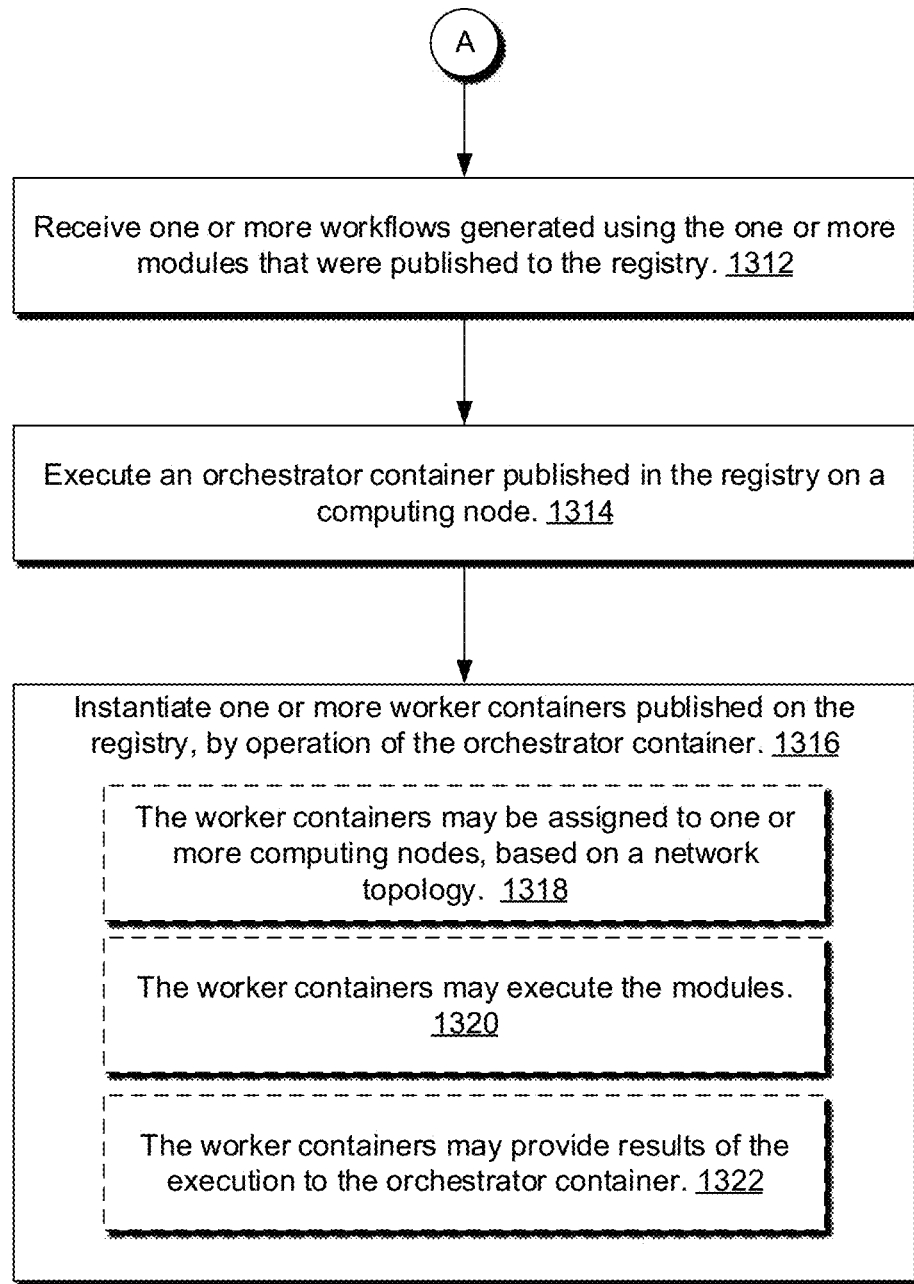

FIGS. 13A-13B illustrate another method 1300, e.g., for computing using a distributed system, according to an embodiment. The method 1300 may include generating a container including an operating environment, 1302 (e.g., 1002, FIG. 10). The method 1300 may also include publishing the container to a container registry, as at 1304 (e.g., 916, FIG. 9). The method 1300 may include generating one or more modules for execution using one of more of the containers published to the registry, as at 1308 (e.g., 1102, FIG. 11). The method 1300 may include publishing the one or more modules to a module registry, as at 1310 (e.g., 928, FIG. 9). One or more of the containers including one or more of the modules may be assigned to a project on a distributed computing project, as at 1311, for executing one or more workflows (e.g., 936, FIG. 9).

The method 1300 may include receiving the one or more workflows generated using the one or more modules that were published to the registry, as at 1312 (e.g., FIG. 9, 932; FIG. 10, 1006). The method 1300 may include executing an orchestrator container published in the registry on a computing node, as at 1314 (e.g., 1008, FIG. 10). The method 1300 may include instantiating one or more worker containers by operation of the orchestrator container, as at 1316 (e.g., 1010, FIG. 10). The worker containers may be assigned to one or more computing nodes, as at 1318, e.g., based on a network topology (e.g., 1012, FIG. 10). The worker containers may execute the modules, as at 1320 (e.g., 1016, FIG. 10). The worker containers may provide results of the execution to the orchestrator container, as at 1322.

Figure 14:
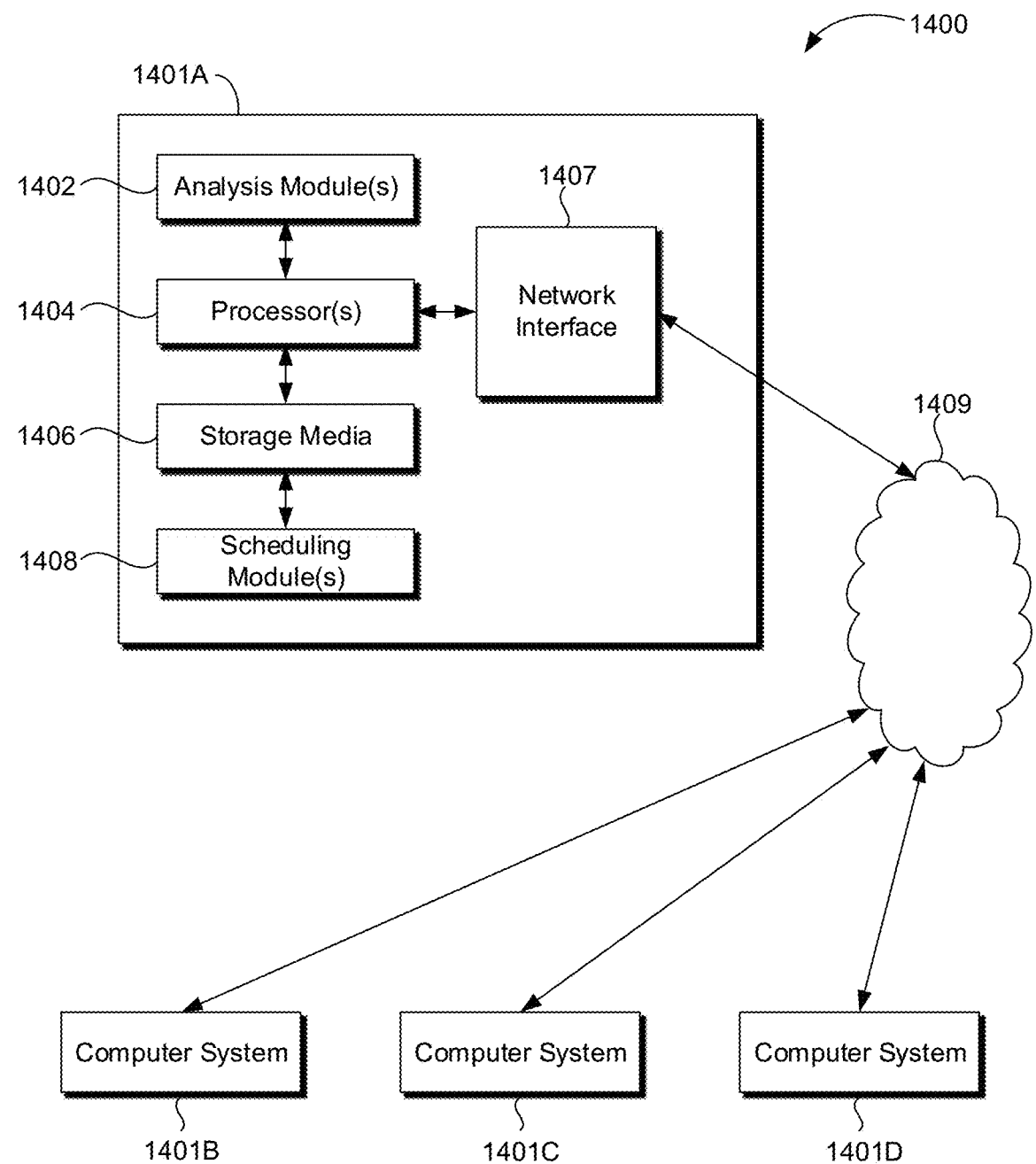
FIG. 14 illustrates a schematic view of a computing system, according to an embodiment.

In some embodiments, any of the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis module(s) 1402 configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor can include a microprocessor, microcontroller, processor module or subsystem, programmable integrated circuit, programmable gate array, or another control or computing device.

The storage media 1406 can be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1400 contains one or more scheduling module(s) 1408. In the example of computing system 1400, computer system 1401A includes the scheduling module 1408. In some embodiments, a single scheduling module may be used to perform some or all aspects of one or more embodiments of the methods. In alternate embodiments, a plurality of scheduling modules may be used to perform some or all aspects of methods.

It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1400, FIG. 14), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for scheduling tasks, comprising:
receiving input that was acquired using data collection devices;
scheduling input tasks on computing resources of a network, wherein the input tasks include processing the input;
creating first placeholder tasks in response to the scheduling of the input tasks, first attribute values of the first placeholder tasks being a same value as first attribute values of the input tasks, and second attribute values of the first placeholder tasks being initialized to a first temporary value:
predicting first tasks based at least in part on the input, wherein the first tasks have not yet been performed, and wherein the first tasks each include a first attribute that is known and corresponds to the first attribute of the input tasks and a second attribute that is unknown prior to at least partially processing the input tasks;
assigning the first placeholder tasks to the computing resources based at least in part on a topology of the network;
receiving one or more updates including the second attribute of the first tasks to be executed, wherein the one or more updates are determined by at least partially processing the input tasks;
splitting the first placeholder tasks to produce a plurality of second placeholder tasks based on the second attribute of each of the first tasks to be executed;
matching the first tasks to the plurality of second placeholder tasks based on the first attributes and the second attributes of the first tasks; and
scheduling the first tasks on the computing resources.

2. The method of claim 1, wherein the one or more data collection devices are arranged in record seismic data in shot lines, and wherein the first attribute of each of the input tasks comprises a number of shot lines assigned thereto, and wherein the second attribute of each of the input tasks comprises a number of shots associated with the individual shot line assigned to the input task.

3. The method of claim 1, wherein the first attribute and the second attribute of the first tasks together provide a number of the first tasks to be executed, and wherein the splitting of the first placeholder tasks comprises splitting the first placeholder tasks such that a number of the plurality of second placeholder tasks matches the number of the first tasks to be executed.

4. The method of claim 1, wherein the plurality of second placeholder tasks each have a first attribute that is the same as the first attribute of one of the input tasks, and a second attribute that is initialized to a second temporary value, wherein the scheduling of the first tasks comprises setting the second attribute of the plurality of second placeholder tasks to equal the second attribute of the one of the first tasks assigned thereto.

5. The method of claim 1, further comprising:
predicting one or more second tasks based on the input, the first tasks, or both;
scheduling the one or more second tasks based on the topology of the network;

at least partially executing the first tasks;
merging results of executing of the first tasks into the second tasks; and
executing the one or more second tasks.

6. The method of claim 5, wherein the input comprises seismic data, the method further comprising:
executing the input tasks comprises converting data from a representation of an acquisition system to a representation for a subsequent processing activity;
executing the first tasks comprises applying time-domain processing comprising one or more of filtering, amplitude normalization, or coherent noise attenuation; and
executing the one or more second tasks comprises one or more of processing in a non-time domain, or generating an image to check a quality of the data.

7. The method of claim 1, wherein:
the scheduling of the input tasks comprises:
scheduling a first input task on a first group of the computing resources;
scheduling a second input task on a second group of the computing resources, wherein the computing resources of the first group communicate with one another more quickly than with the computing resources of the second group; and
the assigning the first placeholder tasks comprises:
scheduling a first one of the first placeholder tasks on the first group; and
scheduling a second one of the first placeholder tasks on the second group, wherein the first one of the first placeholder tasks is predicted based on the first input task, and wherein the second one of the first placeholder tasks is predicted based on the second input task.

8. A method for scheduling tasks, comprising:
receiving seismic data representing a subterranean volume, the seismic data collected using one or more seismic data acquisition devices;
scheduling input tasks for the seismic data, the input tasks each corresponding to different portions of the seismic data, wherein:
the input tasks are scheduled such that respective groups of computing resources of a network are assigned to respective input tasks, and
the input tasks are each associated with a first attribute having a value that is known and a second attribute having a value that is unknown until the input tasks are at least partially processed;
creating placeholder tasks in response to the scheduling of the input tasks, first attribute values of the placeholder tasks being a same value as first attribute values of the input tasks, and second attribute values of the placeholder tasks being initialized to a first temporary value;
assigning the placeholder tasks corresponding to respective input tasks to the respective groups of computing resources associated with the respective input tasks, wherein a number of the placeholder tasks assigned to the respective groups of computing resources corresponds to the value of the first attribute of the respective input task;
determining the value of the second attribute by at least partially processing the input tasks using the computing resources to which the input tasks are assigned;
partitioning the individual placeholder tasks based on a number of values of the second attribute;
after partitioning, matching intermediate tasks with the partitioned placeholder tasks, wherein:
the intermediate tasks each are associated with a value for the first attribute and a value for the second attribute, and
the intermediate tasks are matched with the partitioned placeholder tasks based on the values of the first attributes and the values of the second attributes of the intermediate tasks and on the values of the first attributes and the second attributes of the partitioned placeholder tasks; and
processing the intermediate tasks, after matching the intermediate tasks, using the computing resources assigned to the partitioned placeholder tasks with which the intermediate tasks were matched.

9. The method of claim 8, wherein each of the input tasks corresponds to a different time duration over which the seismic data was collected.

10. The method of claim 8, wherein the partitioning of the individual placeholder tasks comprises providing at least one placeholder task for each unique combination of the values of the first and second attributes.

11. The method of claim 8, wherein each value of the first attribute comprises a shot line number, and wherein each value of the second attribute comprises a shot number associated with one of the shot line numbers.

12. The method of claim 11, wherein after the partitioning of the individual placeholder tasks, there exists a partitioned placeholder task for each shot number associated with each shot line number, and wherein the intermediate tasks are single-shot tasks.

13. The method of claim 8, wherein the different groups of computing resources have relatively slow connectivity therebetween, and wherein the computing resources within an individual one of the groups of computing resources have relatively high connectivity therebetween.

14. The method of claim 13, wherein the intermediate tasks associated with one of the input tasks are all assigned to a same one of the groups of computing resources, and wherein the intermediate tasks associated with different ones of the input tasks are associated with different groups of computing resources.

15. The method of claim 8, wherein processing the intermediate tasks includes applying time-domain processing including one or more of filtering, amplitude normalization, or coherent noise attenuation.

16. The method of claim 8, further comprising merging output of the intermediate tasks associated with the respective input tasks, after processing the intermediate tasks, wherein merging comprises communicating between the computing resources within individual groups and not between the computing resources of different groups of the groups of computing resources.

17. The method of claim 16, wherein the merging of the results of the intermediate tasks comprises producing an image of a seismic domain from seismic data collected from two or more shots or two or more time durations.

18. A non-transitory, computer-readable medium storing instructions that, when executed by at least one processor of a computing system, cause the computing system to perform operations, the operations comprising:
receiving input that was acquired using data collection devices;
scheduling input tasks on computing resources of a network, wherein the input tasks include processing the input;
creating first placeholder tasks in response to the scheduling of the input tasks, first attribute values of the first placeholder tasks being a same value as first attribute values of the input tasks, and second attribute values of the first placeholder tasks being initialized to a first temporary value:

predicting first tasks based at least in part on the input, wherein the first tasks have not yet been performed, and wherein the first tasks include a first attribute that is known and corresponds to the first attribute of the input tasks and a second attribute that is unknown prior to at least partially processing the input tasks;

assigning the first placeholder tasks to the computing resources based at least in part on a topology of the network;

receiving one or more updates including the second attribute of the first tasks to be executed, wherein the one or more updates are determined by at least partially processing the input tasks;

splitting the first placeholder tasks to produce a plurality of second placeholder tasks based on the second attribute of one or more of the first tasks to be executed;

matching the first tasks to the plurality of second placeholder tasks based on the first attributes and the second attributes of the first tasks; and scheduling the first tasks on the computing resources.

19. The medium of claim 18, wherein the one or more data collection devices are arranged in shot lines and are each configured to record seismic data, and wherein the first attribute comprises a number of shot lines assigned to each of the input tasks, and wherein the second attribute comprises a number of shots associated with the individual shot line associated with each of the input tasks.

20. The medium of claim 18, wherein:
the operations further comprise:
    predicting one or more second tasks based on the input, the first tasks, or both;
    scheduling the one or more second tasks based on the topology of the network;
    at least partially executing the first tasks;
    merging results of executing of the first tasks into the second tasks;
    executing the one or more second tasks; and
executing the input tasks comprises converting data from a representation of an acquisition system to a representation for a subsequent processing activity;
executing the first tasks comprises applying time-domain processing comprising one or more of filtering, amplitude normalization, or coherent noise attenuation; and
executing the one or more second tasks comprises one or more of processing in a non-time domain, or generating an image to check a quality of the data.

* * * * *